US010713432B2

(12) United States Patent
Goyal et al.

(10) Patent No.: US 10,713,432 B2
(45) Date of Patent: Jul. 14, 2020

(54) CLASSIFYING AND RANKING CHANGES BETWEEN DOCUMENT VERSIONS

(71) Applicant: Adobe Inc., San Jose, CA (US)

(72) Inventors: Tanya Goyal, Mumbai (IN); Sachin Kelkar, Maharashtra (IN); Natwar Modani, Karnataka (IN); Manas Agarwal, Uttar Pradesh (IN); Jeenu Grover, Punjab (IN)

(73) Assignee: ADOBE INC., San Jose, CA (US)

( * ) Notice: Subject to any disclaimer, the term of this patent is extended or adjusted under 35 U.S.C. 154(b) by 225 days.

(21) Appl. No.: 15/476,640

(22) Filed: Mar. 31, 2017

(65) Prior Publication Data

US 2018/0285326 A1 Oct. 4, 2018

(51) Int. Cl.
| | |
|---|---|
| *G06F 17/00* | (2019.01) |
| *G06F 40/194* | (2020.01) |
| *G06F 40/117* | (2020.01) |
| *G06F 40/166* | (2020.01) |
| *G06F 40/197* | (2020.01) |

(52) U.S. Cl.
CPC .......... *G06F 40/194* (2020.01); *G06F 40/117* (2020.01); *G06F 40/166* (2020.01); *G06F 40/197* (2020.01)

(58) Field of Classification Search
CPC .. G06F 17/2288; G06F 17/24; G06F 17/2211; G06F 17/218; G06F 40/194; G06F 40/197; G06F 40/166; G06F 40/117
USPC ................................................ 715/229, 255
See application file for complete search history.

(56) References Cited

U.S. PATENT DOCUMENTS

| | | | | | |
|---|---|---|---|---|---|
| 4,807,182 | A | * | 2/1989 | Queen ................. | G06F 17/2211 707/999.002 |
| 5,806,078 | A | * | 9/1998 | Hug ..................... | G06F 40/197 715/205 |
| 6,931,590 | B2 | * | 8/2005 | Kanie ................... | G06F 17/218 715/234 |
| 6,978,419 | B1 | * | 12/2005 | Kantrowitz ......... | G06F 16/3346 715/209 |

(Continued)

OTHER PUBLICATIONS

Barzilay et al., Sentence Alignment for Monolingual Comparable Corpora, Google Scholar 2003, pp. 25-32 (Year: 2003).*

(Continued)

*Primary Examiner* — Cong-Lac Huynh
(74) *Attorney, Agent, or Firm* — Keller Jolley Preece

(57) ABSTRACT

This disclosure generally covers systems and methods that identify and differentiate types of changes made from one version of a document to another version of the document. In particular, the disclosed systems and methods identify changes between different document versions as factual changes or paraphrasing changes or (in some embodiments) as changes of a more specific revision category. Moreover, in some embodiments, the disclosed systems and methods also generate a comparison of the first and second versions that identifies changes as factual changes or paraphrasing changes or (in some embodiments) as changes of a more specific revision category. The disclosed systems and methods, in some embodiments, further rank sentences that include changes made between different document versions or group similar (or the same) type of changes within a comparison of document versions.

20 Claims, 16 Drawing Sheets

(56) References Cited

U.S. PATENT DOCUMENTS

| | | | | |
|---|---|---|---|---|
| 8,234,563 | B1* | 7/2012 | Vasey | G06F 17/24 |
| | | | | 715/229 |
| 8,316,292 | B1* | 11/2012 | Verstak | G06F 17/30722 |
| | | | | 715/229 |
| 8,453,052 | B1* | 5/2013 | Newman | G06F 17/2211 |
| | | | | 715/255 |
| 8,494,897 | B1* | 7/2013 | Dawson | G06Q 30/02 |
| | | | | 705/14.42 |
| 9,892,118 | B2* | 2/2018 | Kumar | G06F 16/435 |
| 10,025,759 | B2* | 7/2018 | Mulder | G06F 17/2211 |
| 2002/0120604 | A1* | 8/2002 | Labarge | G06F 16/2457 |
| 2002/0124026 | A1* | 9/2002 | Weber | G06F 40/103 |
| | | | | 715/256 |
| 2004/0085354 | A1* | 5/2004 | Massand | G06F 17/2229 |
| | | | | 715/751 |
| 2004/0210885 | A1* | 10/2004 | Wang | G06F 8/71 |
| | | | | 717/158 |
| 2006/0218171 | A1* | 9/2006 | Wakeam | G06K 9/00409 |
| 2006/0274703 | A1* | 12/2006 | Connelly | H04L 41/0622 |
| | | | | 370/338 |
| 2007/0271509 | A1* | 11/2007 | Abernethy | G06F 17/24 |
| | | | | 715/256 |
| 2008/0077848 | A1* | 3/2008 | Roberts | G06F 17/2247 |
| | | | | 715/229 |
| 2011/0106829 | A1* | 5/2011 | Pradhan | G06F 17/30699 |
| | | | | 707/765 |
| 2012/0072859 | A1* | 3/2012 | Wang | G06K 9/00442 |
| | | | | 715/764 |
| 2013/0218872 | A1* | 8/2013 | Jehuda | G06F 16/951 |
| | | | | 707/722 |
| 2014/0081903 | A1* | 3/2014 | Koosel | G06F 16/254 |
| | | | | 707/602 |
| 2014/0101526 | A1* | 4/2014 | Marsh | G06F 17/2211 |
| | | | | 715/229 |
| 2014/0281872 | A1* | 9/2014 | Glover | G06F 40/197 |
| | | | | 715/229 |
| 2016/0055196 | A1* | 2/2016 | Collins | G06F 17/2211 |
| | | | | 707/690 |
| 2016/0140530 | A1* | 5/2016 | Drey | G06F 40/197 |
| | | | | 705/14.55 |
| 2016/0179868 | A1* | 6/2016 | Rajpathak | G06F 17/30705 |
| | | | | 707/690 |
| 2016/0321225 | A1* | 11/2016 | Keslin | G06F 16/176 |
| 2017/0300565 | A1* | 10/2017 | Calapodescu | G06F 17/30707 |
| 2018/0052816 | A1* | 2/2018 | Ma | G06F 17/2785 |
| 2018/0061254 | A1* | 3/2018 | Amigud | G09B 5/00 |
| 2018/0089155 | A1* | 3/2018 | Baron | G06F 40/197 |
| 2018/0165260 | A1* | 6/2018 | Soni | G06F 40/166 |
| 2018/0191764 | A1* | 7/2018 | Chawla | H04L 63/1433 |
| 2018/0203844 | A1* | 7/2018 | Greer | G06F 17/2211 |
| 2018/0204135 | A1* | 7/2018 | Narasimha | G06N 20/00 |
| 2018/0268456 | A1* | 9/2018 | Kumar | G06Q 30/0625 |
| 2018/0293308 | A1* | 10/2018 | Miller | G06T 11/206 |
| 2019/0325009 | A1* | 10/2019 | Nguyen | G06F 16/176 |

OTHER PUBLICATIONS

Chawathe et al., Change Detection in Hierarchically Structured Information, ACM 1996, pp. 493-504. (Year: 1996).*

Manouselis et al., Analysis and Classification of Multi-Criteria Recommender Systems, Springer 2007, pp. 415-441. (Year: 2007).*

Hoad et al., Methods for identifying Versioned and Plagiarized Documents, Wiley 2003, pp. 203-215. (Year: 2003).*

Zhang, Fan, and Diane Litman. "Sentence-Level Rewriting Detection." Grantee Submission (2014).

Mihalcea, R. and Tarau, P., Jul. 2004, TextRank: Bringing order into texts. Association for Computational Linguistics.

Fernanda B. Viégas, Martin Wattenberg, and Kushal Dave. 2004. Studying cooperation and conflict between authors with history flow visualizations. In Proceedings of the SIGCHI Conference on Human Factors in Computing Systems (CHI '04).

F.M. Zanzotto and M. Pennacchiotti. 2010. Expanding textual entailment corpora from Wikipedia using co-training. In Proceedings of the 2nd Workshop on Collaboratively Constructed Semantic Resources, COLING 2010.

Max and G. Wisniewski. 2010. Mining naturally-occurring corrections and paraphrases from Wikipedia's revision history. In Proceedings of LREC.

Amit Bronner and Christof Monz. 2012. User edits classification using document revision histories. In Proceedings of the 13th Conference of the European Chapter of the Association for Computational Linguistics (EACL '12).

Elisabeth Lex, Michael Voelske, Marcelo Errecalde, Edgardo Ferretti, Leticia Cagnina, Christopher Horn, Benno Stein, and Michael Granitzer. 2012. Measuring the quality of web content using factual information. In Proceedings of the 2nd Joint WICOW/AIRWeb Workshop on Web Quality (WebQuality '12).

* cited by examiner

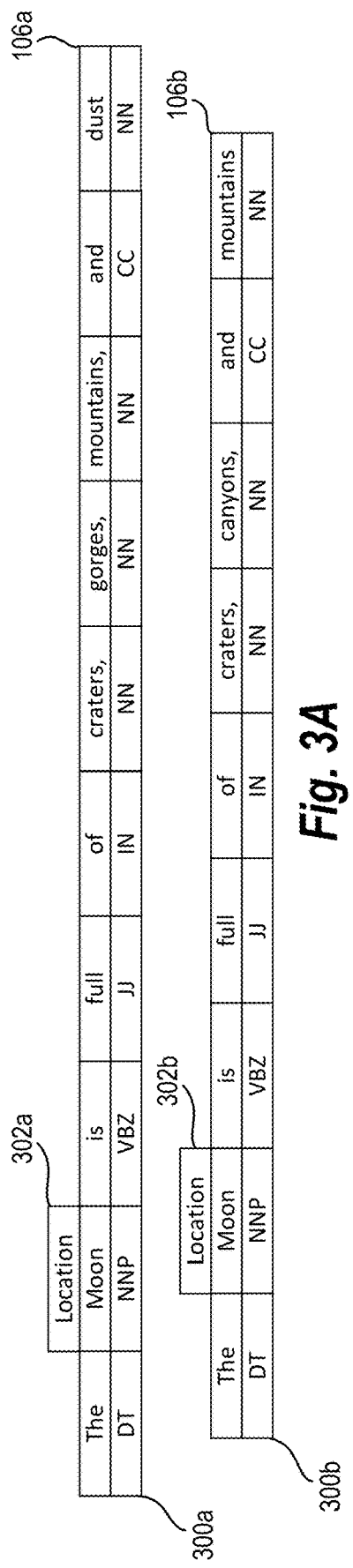
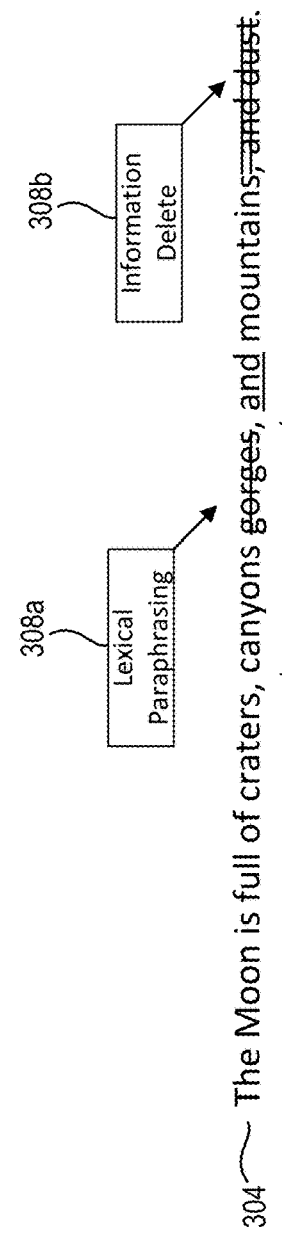
Fig. 3A
Fig. 3B

400 — Most telescopes cannot detect Buzz Aldrin's dusty footprints on the Moon ~~cannot be detected by most telescopes.~~

402 — Paraphrase Change

Fig. 4

500
1. But do not try to find dust because it is too difficult for a telescope to detect. —116
2. A telescope can find all of these topographical features on the Moon. —110b
3. The Moon is full of craters, canyons, and mountains. —106b
4. Most telescopes cannot detect Buzz Aldrin's dusty footprints on the Moon. —112b
5. It has north and south poles and near and far sides. —108b

Fig. 5

CLASSIFYING AND RANKING CHANGES BETWEEN DOCUMENT VERSIONS

BACKGROUND

Individuals and collaborators of educational institutions, firms, joint ventures, and other organizations often compose, view, and edit documents using document authoring tools, such as word processors or desktop publishing software. When such individuals or collaborators revise or otherwise produce different versions of a document, they often use conventional document authoring tools that lack effective features for comparing different document versions. Such conventional document authoring tools make it cumbersome for individuals to review changes between an initial version and a final version of a document or (even more cumbersome) review changes among several versions of a document.

As individuals and collaborators increasing rely on document authoring tools to compare and review changes to documents, some document authoring tools have incorporated features that identify changes among different versions of a document. For example, some conventional document authoring tools identify textual changes between document versions. But many existing authoring tools do so with a list or representation of textual changes shown in a fixed format. For example, regardless of the type of change—whether a capitalization of a letter or a deletion of an entire sentence—some conventional document authoring tools represent each change (or many different types of changes) using the same label or the same markings for revisions, such as strikethrough and underline fonts for deletions and insertions. Such inflexible representation of revisions can increase an individual's review time by requiring line-by-line comparison of documents or review of every marked-up revision within a marked-up document.

In addition to fixed formats, some conventional document authoring tools fail to identify minor or slight changes to a sentence or paragraph. In some cases, conventional document authoring tools fail to identify a word change or an insertion of a punctuation mark within a sentence or paragraph and instead identify such changes as deletions or insertions of a sentence or paragraph. By failing to detect such minor changes, conventional authoring tools misrepresent textual changes as inserted sentences or paragraphs. Such inaccurate detection can complicate an individual's or collaborator's comparison of documents by identifying and reviewing sentences and paragraphs that incorrectly identify changes.

SUMMARY

This disclosure describes one or more embodiments of systems and methods that solve some or all of the foregoing problems in addition to providing other benefits. To solve these and other problems, the disclosed systems and methods identify and differentiate types of changes made from one version of a document to another version of the document. In particular, the disclosed systems and methods identify changes between different document versions as factual changes or paraphrasing changes. In some cases, the disclosed systems and methods also rank sentences that include changes made between different document versions or group similar (or the same) type of changes within a comparison of document versions.

In certain embodiments, for example, the disclosed systems and methods compare a first version and a second version of a document. As part of that comparison, the systems and methods map sentences within the first version to sentences within the second version. The disclosed systems and methods then identify changes between mapped sentences of the first and second versions as factual changes or paraphrasing changes or (in some cases) as changes of a more specific revision category. In some embodiments, the disclosed systems and methods also generate a comparison of the first and second versions that identifies changes as factual changes or paraphrasing changes or (again, in some embodiments) as changes of a more specific revision category.

Based on the mapped sentences and identified change types, the disclosed systems and methods optionally rank sentences that include changes between document versions and generate a comparison of the document versions that shows revised sentences of a certain ranking. In addition or in the alternative, in some instances, the disclosed systems and methods identify changes of a same or similar type between document versions and generate a comparison of the document versions that group such changes together for display.

The following description sets forth additional features and advantages of one or more embodiments of the disclosed systems and methods. In some cases, such features and advantages will be obvious to a skilled artisan from the description or may be learned by the practice of the disclosed embodiments.

BRIEF DESCRIPTION OF THE DRAWINGS

The detailed description refers to the drawings briefly described below.

FIG. 3A illustrates part-of-speech sequences in accordance with one or more embodiments.

FIG. 3B illustrates revision labels for changes in accordance with one or more embodiments.

FIG. 4 illustrates a revision label for a sentence in accordance with one or more embodiments.

FIG. 5 illustrates a ranking of revised sentences in accordance with one or more embodiments.

DETAILED DESCRIPTION

Figure 1A:
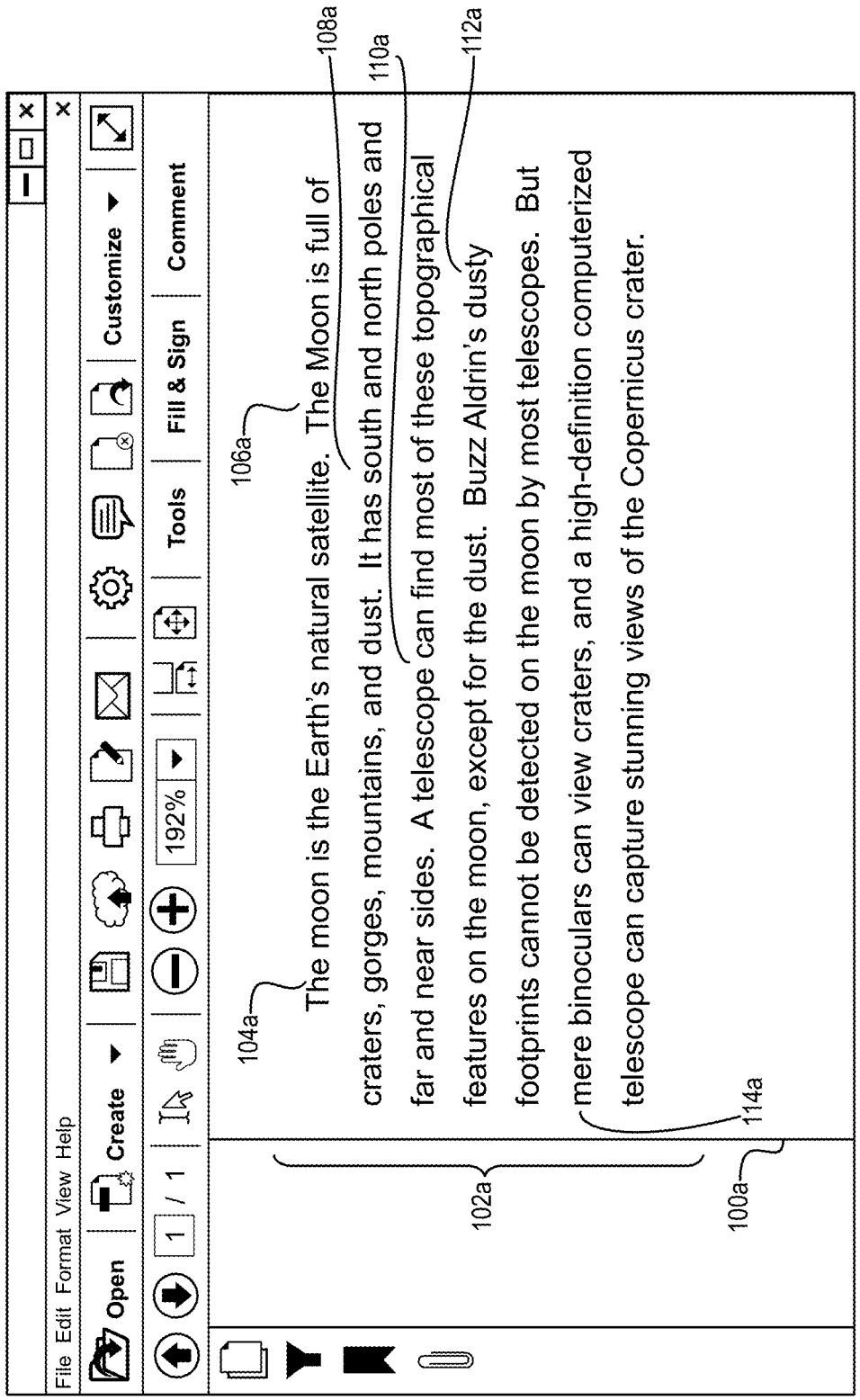
FIGS. 1A-1B illustrate a first version of a document and a second version of the document, respectively, in accordance with one or more embodiments of a document-comparison system.

This disclosure describes one or more embodiments of a document-comparison system that identifies and differentiates types of changes made from one version of a document to another version of the document. In particular, the document-comparison system identifies changes between different document versions as factual changes (which affect a sentence's meaning) or paraphrasing changes (which alter the words or syntax of a sentence without affecting a sentence's meaning). In some cases, the document-comparison system also ranks sentences that include changes made between different document versions or groups similar type of changes within a comparison of document versions.

In certain embodiments, for example, the document-comparison system compares a first version and a second version of a document. As part of that comparison, the document-comparison system maps sentences within the first version to sentences within the second version. For example, the document-comparison system optionally maps a sentence from the first version to one or more revised sentences in a second version. The document-comparison system then identifies changes between mapped sentences of the first and second versions as factual changes or paraphrasing changes.

In some such embodiments, the document-comparison system identifies changes between mapped sentences as part of a more specific revision category, such as part of subcategories of factual changes or subcategories of paraphrasing changes. The document-comparison system then generates a comparison of the first and second versions that identifies changes as factual changes or paraphrasing changes or (in some embodiments) as changes belonging to a more specific revision category.

To identify changes between mapped sentences, the document-comparison system optionally applies a deterministic classification algorithm. When applying that algorithm, in some embodiments, the document-comparison system identifies part-of-speech and named-entities within mapped sentences of the first and second versions. The document-comparison system then compares sequences of the part-of-speech assigned to the mapped sentences to determine whether the sequences of part-of-speech for each combination exceeds or falls below a threshold ratio. Based on whether a particular combination of mapped sentences exceeds or falls below the threshold ratio, the document-comparison system applies rules of analysis to compare the terms of each combination of mapped sentences and identify changes between mapped sentences as part of subcategories of factual changes or subcategories of paraphrasing changes.

In addition to applying a deterministic classification algorithm, the document-comparison system optionally applies a supervised classification algorithm. When applying the supervised classification algorithm, the document-comparison system identifies certain combinations of mapped sentences that include unidentified changes that the deterministic classification algorithm did not classify. Regardless of whether the document-comparison system identifies unidentified changes, the document-comparison system analyzes both part-of-speech and named-entities of the combinations of mapped sentences. While performing this analysis, the document-comparison system detects sentence features within the combinations of mapped sentences. Based on the detected sentence features, the document-comparison system identifies one or more combinations of mapped sentences as including factual changes or paraphrasing changes.

As noted above, after identifying types of changes, the document-comparison system generates a comparison of the first and second versions that identifies changes as factual changes or paraphrasing changes. To illustrate, in some embodiments, the generated comparison may be a document, list, or other representation of the types of changes made between different document versions. In one embodiment, a comparison includes documents showing revision marks that identify the types of changes made as factual changes or paraphrasing changes or, more specifically, as specific subcategories of factual changes or paraphrasing changes. In another embodiment, a comparison includes a side-by-side view of a first version and a second version of a document that includes labels for factual changes, paraphrasing changes, or specific subcategories of factual changes or paraphrasing changes. In contrast to conventional document authoring tools, the document-comparison system's comparisons specify types of changes made between versions to provide a more accurate, flexible, and efficient way to review document changes.

By applying analysis rules and generating a comparison that identifies changes by type, the disclosed document-comparison system automates a comparison task that computer systems could not previously perform. Whereas conventional document authoring tools often required reviewers to compare marked-up versions line by line, the disclosed document-comparison system avoids such tedious line-by-line comparison by identifying specific types of changes for the reviewer as part of an automated process. The disclosed document-comparison system also improves on existing document authoring tools. Rather than identifying all types of textual changes with a same or fixed format, the disclosed document-comparison system provides a more flexible and nuanced approach to both identifying and representing changes that can filter and present changes by type.

As noted above, in some embodiments, the document-comparison system ranks sentences that include changes between document versions. In some embodiments, the document-comparison system determines a relative importance of revised sentences and optionally generates a comparison of the document versions that shows revised sentences of a certain ranking. For example, the document-comparison system may filter revised sentences of a certain ranking to display within a document comparison.

In addition or in the alternative, in some instances, the document-comparison system identifies changes of a same or similar type between document versions. For instance, in some embodiments, the document-comparison system identifies changes to a repeated term, phrase, or sentence within a document or identifies changes of the same type, such as all changes of a specific subcategory of factual change or paraphrasing change. In some cases, the document-comparison system also generates a comparison of two document versions that groups such changes together for display (e.g., by filtering changes to a repeated term, phrase, or sentence or filtering changes of the same type for display within a document comparison).

By ranking revised sentences or grouping changes, as described above, the document-comparison system provides a representation of changes that expedites an individual's or collaborator's review compared to conventional document authoring tools. Specifically, the ranking and grouping of changes offers a more flexible approach to computer-automated comparison than conventional document authoring tools. Such conventional document authoring tools often present all types of changes between document versions without (or with little) variation. By contrast, the disclosed document-comparison system filters and isolates ranked or grouped changes between document versions of differing importance for presentation within a comparison.

Figure 1B:
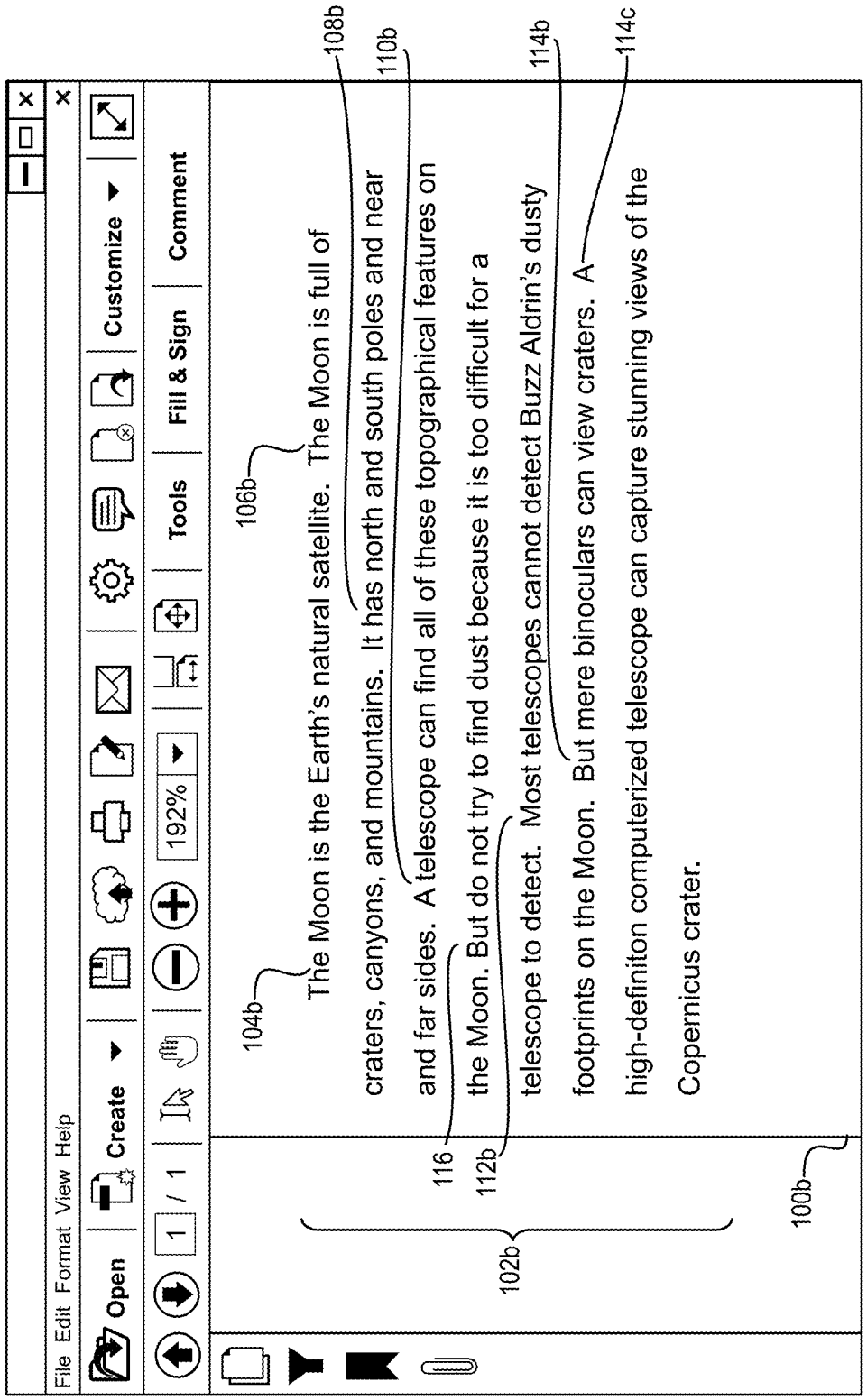
Figure 1C:
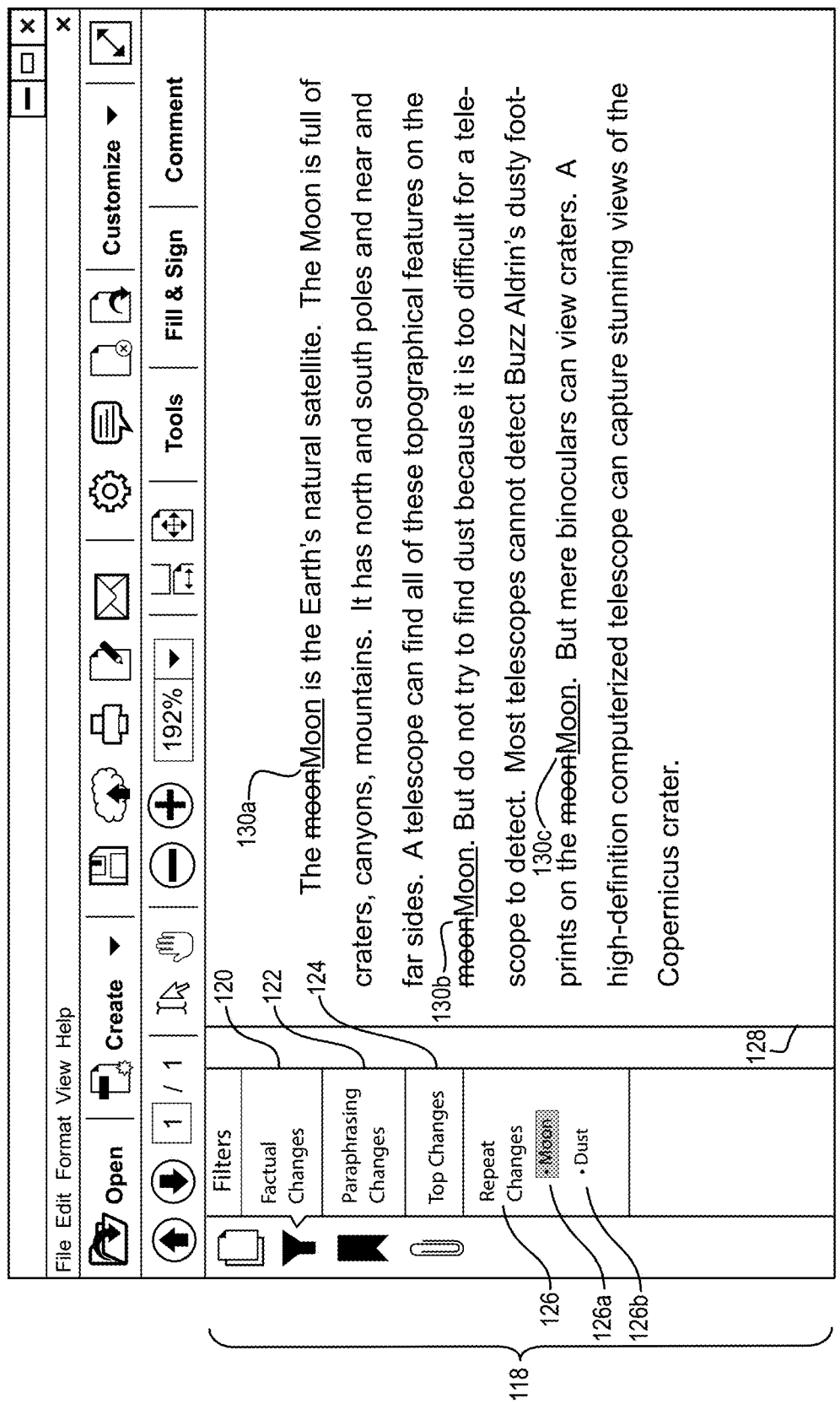
FIG. 1C illustrates a document comparison in accordance with one or more embodiments.

Turning now to the figures, FIGS. 1A-1C provide an overview of a process by which a document-comparison system identifies and differentiates types of changes made from one version of a document to another version of the document. While the description of FIGS. 1A-1C below provides an overview, the disclosure provides further description and additional embodiments of the document-comparison system with reference to the other figures.

FIGS. 1A and 1B respectively illustrate a first digital version 100a and a second digital version 100b of a document. Both the digital versions 100a and 100b include a plurality of sentences. A first plurality of sentences 102a are within and correspond to the first digital version 100a; a second plurality of sentences 102b are within and correspond to the second digital version 100b. As shown in FIGS. 1A and 1B, the second plurality of sentences 102b of the second digital version 100b include changes made to the first plurality of sentences 102a of first digital version 100a. In particular, the second plurality of changes includes an added sentence 116 that is not part of first digital version 100a but is inserted into the second digital version 100b.

As suggested above, in some embodiments, the document-comparison system maps the first plurality of sentences 102a to the second plurality of sentences 102b. When mapping sentences, for example, the document-comparison system maps a particular sentence of one version of the document to one or more particular sentences of another version of the document. Specifically, with reference to FIGS. 1A and 1B, the document-comparison system maps a sentence 104a in the first digital version 100a to a sentence 104b in the second digital version 100b, a sentence 106a in the first digital version 100a to a sentence 106b in the second digital version 100b, a sentence 108a in the first digital version 100a to a sentence 108b in the second digital version 100b, a sentence 110a in the first digital version 100a to a sentence 110b in the second digital version 100b, a sentence 112a in the first digital version 100a to a sentence 112b in the second digital version 100b, and a sentence 114a in the first digital version 100a to both a sentence 114b and a sentence 114c in the second digital version 100b. Additionally, the document-comparison system maps a null sentence (not shown) associated with the first digital version 100a to the added sentence 116 of the second digital version 100b.

After mapping the first plurality of sentences 102a to the second plurality of sentences 102b, the document-comparison system identifies changes between one or more of the first plurality of sentences 102a and the second plurality of sentences 102b as factual changes or paraphrasing changes. For example, the document-comparison system identifies the change between the sentences 104a and 104b as a paraphrasing change (i.e., changing the term "moon" to "Moon" with a capital "M") by applying a deterministic classification algorithm and/or a supervised classification algorithm. Similarly, the document-comparison system identifies the insertion of the added sentence 116 as a factual change between the first plurality of sentences 102a and the second plurality of sentences 102b by applying the deterministic classification algorithm and/or the supervised classification algorithm.

As used in this disclosure, the term "factual change" refers to a change from one version of a document to another version of the document that affects the meaning of a term, phrase, or sentence. For example, a factual change includes a change from one proper noun to another non-synonymous proper noun (e.g., from "Marcus" to "Kelly") or from one verb to another non-synonymous verb (e.g., from "run" to "walk"). Conversely, the term "paraphrasing change" refers to a change from one version of a document to another version of the document that affects the syntax or phrasing of a term, phrase, or sentence. For example, a paraphrasing change includes a change that reorders phrases within a sentence (e.g., reordering prepositional phrases), replaces a term with a synonym, or changes a sentence from active to passive voice.

In some embodiments, the document-comparison system further ranks or determines a relative importance of certain of the second plurality of sentences 102b that include a change to the first plurality of sentences 102a. For example, the document-comparison system optionally generates a composite-importance score for each of the changed sentences of the second plurality of sentences 102b. Based on the composite-importance scores, the document-comparison system may determine that the added sentence 116 has a highest relative composite importance among the changed sentences of the second plurality of sentences 102b. As discussed further below, the document-comparison system optionally generates a comparison that identifies revised sentences (from the second plurality of sentences 102b) having a highest relative importance. For example, document-comparison system filters revised sentences of a certain ranking or of a certain score threshold to display within a document comparison.

Additionally, in some embodiments, the document-comparison system identifies changes of a same or similar type between document versions. For instance, as suggested by FIGS. 1A and 1B, the document-comparison system identifies changes of a same type or changes to a repeated term, phrase, or sentence, such as the repeated change of the term "moon" to the term "Moon" with a capital "M." In some embodiments, the document-comparison system generates a comparison of two document versions that group such repeated changes together for display.

FIG. 1C illustrates a document comparison 128 that groups together changes to a repeated term within a graphical user interface 118. As shown in FIG. 1C, the graphical user interface 118 includes filters 120, 122, 124, and 126, and subfilters 126a and 126b. When the document-comparison system receives an indication that a user selects one of the filters 120, 122, 124, or 126, or subfilters 126a or 126b, respectively, the document-comparison system causes a computing device to present representations of factual changes, paraphrasing changes, top changes, or repeated changes (which respectively correspond to filters 120, 122, 124, and 126), or various repeated changes (which correspond to subfilters 126a or 126b).

For example, as shown in FIG. 1C, when the document-comparison system receives an indication that a user selects subfilter 126a, the document-comparison system causes the computing device to present representations of changes to a repeated term (i.e., the term "moon") within the graphical user interface 118. Specifically, the document-comparison system generates the document comparison 128 within the graphical user interface 118 to indicate repeated changes 130a, 130b, and 130c (i.e., the repeated change of the term "moon" to the term "Moon" with a capital "M"). Each of the repeated changes 130a, 130b, and 130c include a single strikethrough line or single underline to indicate each change is a paraphrasing change. As discussed below, the document-comparison system optionally generates document comparisons that similarly indicate factual changes, paraphrasing changes, or subcategories of the factual changes or paraphrasing changes.

Turning now from the overview to further description and additional embodiments of the document-comparison system. As noted above, in some embodiments, the document-comparison system maps sentences within a first version of a document to sentences within a second version of a document. For example, the document-comparison system may map a particular sentence (from the first version) to one or more revised sentences (from the second version) that correspond to that particular sentence. Conversely, the document-comparison system may map a particular sentence (from the second version) to one or more sentences (from the first version) that correspond to that particular sentence. In short, the document-comparison system maps/identifies corresponding sentences from different document versions.

As used in this disclosure, the term "first version" refers to a version of a document that forms a basis for comparing different document versions. For example, a first version many be an original draft of a document (or any subsequent draft of the document) that the document-comparison system uses as a base document to compare to another version. The term "second version" refers to a version of a document with which the first version is compared. For example, a second version may be a final draft of a document (or any intermediate version of the document) that the document-comparison system compares to a first version (e.g., an earlier version of the document).

In one embodiment of the present disclosure, the document-comparison system receives a first version and a second version of a document, such as the first digital version 100a and the second digital version 100b. The document-comparison system then applies a sentence-alignment algorithm to the first and second versions. By applying the sentence-alignment algorithm to the two versions, the document-comparison system outputs a set of mapped-sentence combinations or a single mapped-sentence combination. The document-comparison system then uses the mapped-sentence combinations to identify types of changes.

As used in this disclosure, the term "mapped-sentence combination" refers to a combination of one or more sentences of a version of a document, on the one hand, and one or more sentences of another version of the document, on the other hand. For example, a mapped-sentence combination includes a sentence from a first version mapped to another sentence from a second version. In such cases, the sentence from the second version may include revisions that differ from (but also correspond to) the sentence from the first version. Such a mapped-sentence combination would include, for example, the sentence "I am going to the market" from a first version mapped to the sentence "I am going to the market now" from a second version. In some embodiments, the document-comparison system exclusively uses mapped-sentence combinations that comprise a single sentence of a version of a document, on the one hand, and a single sentence of another version of the document, on the other hand. As another example, a mapped-sentence combination includes two sentences from a first version mapped to a sentence from a second version. In such instances, the sentence from the second version may consolidate revised versions of the two sentences from the first version. An example of such a mapped-sentence combination includes the sentences "I am going to the market" and "You will come with me" from a first version mapped to the sentence "I am going to the market now, and you will come with me" from a second version.

To generate mapped-sentence combinations, in some embodiments, the document-comparison system applies a sentence-alignment algorithm to generate a sentence vector for each sentence within a first version of a document and a sentence vector for each sentence within a second version of a document. When generating such sentence vectors, the document-comparison system incorporates (as a factor of a sentence vector) synonyms for each unique term within each of the sentences of the first and second versions. In some embodiments, the document-comparison system incorporates (as factors of the sentence vector) a top number of synonyms (e.g., a top three, four, five, or any number of synonyms) for each unique term within a sentence based on a digital thesaurus or a lexical database that groups together sets of synonyms, such as WordNet from Princeton University, Princeton, N.J.

In addition to a top number of synonyms, in some embodiments, the document-comparison system incorporates (as a factor of a sentence vector) a term-similarity score for a similarity between each term of one of the sentences within the first version and each term of one of the sentences within the second version. In some such embodiments, the document-comparison system generates a sentence vector for each sentence by accounting for a term-similarity score between each term of each sentence within the first version and each term of each sentence within the second version.

Based on the sentence vector for each of the sentences of the first and second versions, the document-comparison system optionally generates a sentence-similarity score for a similarity between each of the sentences of the first version and each of the sentences of the second version. As discussed further below, the document-comparison system uses sentence-similarity scores to generate a sentence matrix representing each of the sentences within the first version and each of the sentences within the second version.

As an illustration of embodiments of sentence vectors and sentence-similarity scores, in some embodiments, the document-comparison system generates a modified term frequency-inverse document frequency ("TF-IDF") vector for each sentence of a first version and each sentence of a second version. In such cases, the document-comparison system considers each sentence as if it were a separate document. When calculating TF-IDF vectors for each sentence, the document-comparison system represents sentences of a first version of a document as $D_1=[S_i, S_2, \ldots S_m]$ and sentences of a second version of the document as $D_2=[S_i', S_2', S_n']$, where $S_i$, $S_2$, and $S_m$ each represent a sentence within the first version and where $S_i'$, $S_2'$, and $S_n'$ each represent a sentence within the second version. For each sentence ($S_m$ and $S_n'$), the document-comparison system generates a TF-IDF vector using the following function:

$$\text{Modified } TF - IDF(t) = \frac{\sum_{t' \in Synonyms(t)} sim(t, t') * tf(t') * idf(t')}{\sum_{t \in Snonyms(t)} sim(t, t')} \quad (1)$$

In function (1), t represents a term in a sentence within the first version, t' represents a term in a sentence of the second version, Synonyms(t) represent a top number of synonyms for a unique term (e.g., from a digital thesaurus or WordNet), and sim(t, t') represents the WordNet similarity oft and t'.

In addition to function (1), the document-comparison system uses each TF-IDF vector to measure a similarity between each of the sentences within the first version and each of the sentences of the second version. In some embodiments, the document-comparison system uses the following function to generate a sentence-similarity score for a similarity between a pair of sentences:

$$sim(S_i, S_j) = \frac{S_i \cdot S_j}{|S_i||S_j|} \quad (2)$$

In function (2), $S_i$ represents a TF-IDF vector for a sentence within the first version and $S_j$ represents a TF-IDF vector for a sentence within the second version. As indicated by the operators in function (2), function (2) represents a cosine similarity.

In some embodiments, the document-comparison system uses the sentence-similarity scores generated by function (2) as factors for generating a sentence matrix. The document-comparison system charts a path through the sentence matrix to map sentences from the first version to sentences of the second version.

Figure 2:
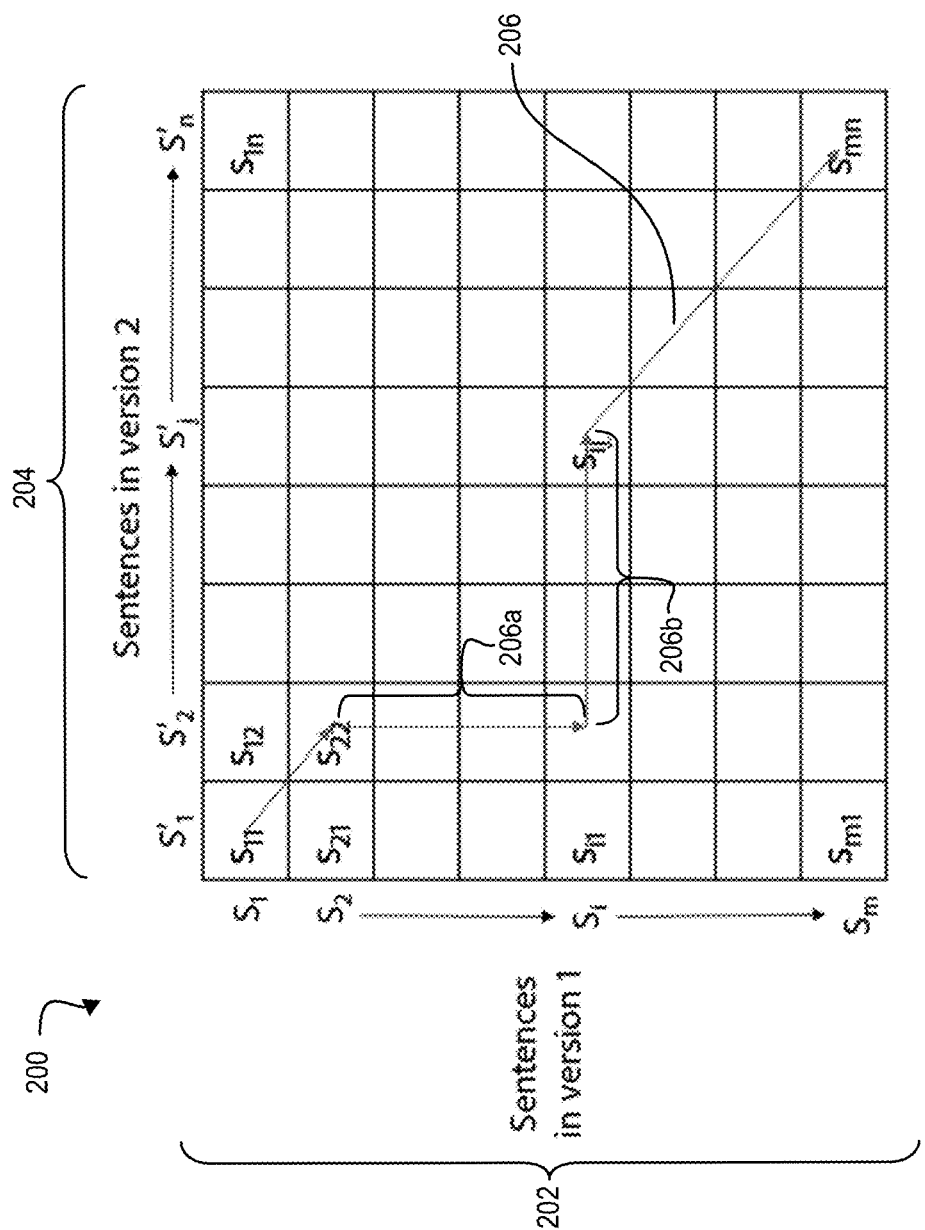
FIG. 2 illustrates a sentence matrix in accordance with one or more embodiments.

FIG. 2 illustrates such a sentence matrix, that is, sentence matrix 200. As shown in FIG. 2, the document-comparison system generates the sentence matrix 200 comprising an axis point for each sentence of the first version, $[S_1, S_2, \ldots S_m]$, and an axis point for each sentence of the second version, $[S_1', S_2', S_j', \ldots S_n']$. The sentence matrix 200 includes the axis point for each of the sentences of the first version along a version-one axis 202 and the axis point for each of the sentences of the second version along a version-two axis 204.

The document-comparison system uses the following function to determine an entry for each sentence pair s(i, j) within the sentence matrix:

$$s(i,j)=\max\{s(i-1,j-1)+sim(i,j), s(i-1,j)+insertCost, s(i,j-1)+deleteCost \quad (3)$$

Function (3) is proposed in Fan Zhang and Diane Litman, "Sentence-Level Rewriting Detection," Proceedings of the Ninth Workshop on Innovative Use of NLP for Building Educational Applications, 149-154 (2014) (hereinafter "Zhang"), the entire contents of which are hereby incorporated by reference. The document-comparison system uses function (3) and the dynamic programming approach outlined in Zhang to determine an entry for each sentence pair s(i, j) and to map sentences from a first version to sentences of a second version. Consistent with Zhang, function (3) enables the document-comparison system to map sentences of a first version to sentences of a second version by considering a similarity between each of the sentences within the first version and each of the sentences of the second version—as well as each sentence's proximity to highly similar sentences.

In some embodiments, the document-comparison system uses a logistic regression classifier to assign a probability value representing a similarity between each of the sentences within the first version and each of the sentences of the second version. Conversely, in other embodiments, the document-comparison system uses function (2) to generate a sentence-similarity score representing a similarity between each of the sentences within the first version and each of the sentences of the second version.

To generate mapped-sentence combinations, the document-comparison system backtracks through the sentence matrix 200 to chart a path that maximizes a sum of function (3) for the sentence pairs s(i, j) collectively. As shown in FIG. 2, the document-comparison system charts a path 206 that maximizes a sum of function (3) for the sentence pairs s(i, j) collectively. By charting path 206, the document-comparison system infers a corresponding relationship between one or more sentences of the first version and one or more sentences of the second version. After charting the entire path 206, the document-comparison system outputs a set of mapped-sentence combinations in the form of tuples $(S_i, S_j)$ to identify types of changes.

The path 206 indicates different types of sentence mappings. As suggested by a path portion 206a of the path 206, in some embodiments, the document-comparison system maps more than one sentence from the first version to a sentence of the second version. In such cases, the document-comparison system charts the path 206 vertically, as indicated by the path portion 206a. As also suggested by a path portion 206b of the path 206, in some embodiments, the document-comparison system maps a sentence from the first version to more than one sentence of the second version. In such cases, the document-comparison system charts the path 206 horizontally, as indicated by the path portion 206b.

As indicated above, in some instances, a version of a document includes an inserted or deleted sentence that has no corresponding sentence in another version of the document. In such cases, the document-comparison system maps a null sentence (as a placeholder sentence associated with a first version) to an inserted sentence (from a second version) or a deleted sentence (from the first version) to a null sentence (as a placeholder sentence associated with the second version). The term "null sentence" refers to a placeholder that indicates a corresponding sentence within a mapped-sentence combination is an inserted or deleted sentence. Any one of the sentences of the first version, $[S_1, S_2, S_i, \ldots S_m]$, or the sentences of the second version, $[S_1', S_2', S_j', \ldots S_n']$, represented in the sentence matrix 200 may be a null sentence.

To illustrate, using functions (1), (2), and (3), and a sentence matrix, such as the sentence matrix 200, the document-comparison system maps the first plurality of sentences 102a of the first digital version 100a (shown in FIG. 1A) to the second plurality of sentences 102b of the second digital version 100b (shown in FIG. 1B). Specifically, the document-comparison system maps the sentence 104a to the sentence 104b, the sentence 106a to the sentence 106b, the sentence 108a to the sentence 108b, the sentence 110a to the sentence 110b, the sentence 112a to the sentence 112b, and the sentence 114a to both the sentence 114b and the sentence 114c. Additionally, the document-comparison system maps a null sentence (as a placeholder sentence associated with the first digital version 100a) to the added sentence 116 of the second digital version 100b.

As an intermediate part of the process of generating a sentence matrix and charting a path through the sentence matrix, in some embodiments, the document-comparison system tags each sentence of a first version and each sentence of a second version with at least one tag to facilitate mapping sentences. In some such embodiments, the document-comparison system tags each sentence with at least one of an add tag indicating that a sentence has been inserted between versions, a delete tag indicating that a sentence has been deleted between versions, a keep tag indicating that a sentence is unchanged between versions, or a modify tag indicating that a sentence has been modified between versions. The add tag, delete tag, keep tag, and modify tag correspond to and function as the four primitives described in Zhang.

In some embodiments, the document-comparison system relies on a sentence similarity to tag each sentence of the first version and each sentence of the second version with at least one of the add tag, delete tag, keep tag, or modify tag. In some such embodiments, the document-comparison system uses the probability value representing a similarity from Zhang or a sentence-similarity score produced by function (2) as the sentence similarity. By tagging each sentence, the document-comparison system creates an edit sequence for each of the first version and second version. The document-comparison system then aligns the edit sequence of the first version and the edit sequence of the second version as a preliminary mapping of sentences. After generating this preliminary alignment, the document-comparison system modifies the edit sequences based on function (3) while charting a path through a sentence matrix to create a mapping of sentences.

As described in the overview, after mapping sentences within a first version to sentences within a second version, the document-comparison system identifies changes between mapped sentences of the first and second versions as factual changes or paraphrasing changes. In some such embodiments, the document-comparison system identifies changes between mapped sentences as part of a more specific revision category, such as part of subcategories of factual changes or subcategories of paraphrasing changes. By identifying types of changes, the document-comparison facilitates generating a comparison of different document versions that indicates to a reviewer a specific type of change for each change between versions.

In some embodiments, the document-comparison system applies a deterministic classification algorithm to mapped-sentence combinations to identify one or more changes between sentences of a first version and sentences of a second version as factual changes or paraphrasing changes. In some embodiments, the document-comparison system optionally applies both a deterministic classification algorithm and a supervised classification algorithm to mapped-sentence combinations to identify one or more changes between sentences of a first version and sentences of a second version as factual changes or paraphrasing changes.

When applying a deterministic classification algorithm, the document-comparison system optionally assigns a part-of-speech ("POS") tag to each term within sentences of a first version and to each term within sentences of a second version. For example, the document-comparison system optionally uses a POS Tagger, such as a version of the Stanford Log-linear POS Tagger developed by Stanford University, Stanford, Calif., to assign POS tags to each term within sentences of both the first and second versions. By assigning POS tags to each term, the document-comparison system identifies grammatical parts of speech for terms within each sentence. POS tags include, for example, a "CC" for a coordinating conjunction, "DT" for a determiner, "IN" for a preposition or subordinating conjunction, "JJ" for an adjective, "NN" for a singular or mass noun, "NNP" for a singular proper noun, or "VBZ" for a verb that is in third person singular present form.

In some embodiments, when applying a deterministic classification algorithm, the document-comparison system also assigns named-entity tags to certain terms within sentences of a first version and a second version, such as terms representing dates, persons, locations, monetary values, organizations, percentages, quantities, or times. For example, the document-comparison system optionally uses a Named Entity Recognizer, such as a version of the Stanford Named Entity Recognizer developed by Stanford University, Stanford, Calif., to assign named-entity tags to certain terms within sentences of a first version and a second version. Alternatively, in some embodiments, the document-comparison system uses a tagger that combines the functions of a POS Tagger and a Named Entity Recognizer to assigns both POS tags and named-entity tags. Regardless of the method used, in some such embodiments, the document-comparison system assigns named-entity tags to terms within sentences that represent a named entity, such as a date, person, location, monetary value, organization, percentage, quantity, time, or a subset of the foregoing named entities. By assigning named-entity tags, the document-comparison system identifies named entities as a basis for detecting factual changes or paraphrasing changes.

After assigning a POS tag and/or named-entity tags to terms within sentences from a first and second version, in some embodiments, the document-comparison system applies the deterministic classification algorithm to use POS tags and/or named-entity tags for detecting changes between sentences of mapped-sentence combinations. To do so, the document-comparison system optionally applies the deterministic classification algorithm to identify a POS sequence representing each sentence within a first version and each sentence within a second version. Alternatively, the document-comparison system applies the deterministic classification algorithm to identify a POS sequence representing each sentence within each of the mapped-sentence combinations identified using a sentence alignment algorithm.

As used in this disclosure, the term "POS sequence" or "part-of-speech sequence" refers to a sequence of POS tags assigned to each term within a sentence. POS sequences corresponding to sentences from different versions may be identical or different depending on their constituent POS tags. For example, a POS sequence for a sentence (within a first version) and a POS sequence for an additional sentence (within a second version) are identical when both the sentence and the additional sentence lack changes and form a mapped-sentence combination. As another example, a POS sequence for a sentence (within a first version) and a POS sequence for an additional sentence (within a second version) are different when the additional sentence includes changes to terms of the sentence—but both sentences form a mapped-sentence combination.

FIG. 3A illustrates a first POS sequence 300a and a second POS sequence 300b. As shown in FIG. 3A, the first POS sequence 300a corresponds to the sentence 106a of the first digital version 100a (hereinafter "original sentence 106a"), and the second POS sequence 300b corresponds to the sentence 106b of the second digital version 100b (hereinafter "modified sentence 106b" when referred to separately). The first POS sequence 300a comprises a sequence of POS tags that the document-comparison system assigns to each term within the original sentence 106a using a deterministic classification algorithm. Similarly, the second POS sequence 300b comprises a sequence of POS tags that the document-comparison system assigns to each term within the modified sentence 106b using the deterministic classification algorithm.

As suggested above, and as shown in FIG. 3A, the original sentence 106a and the modified sentence 106b correspond to one another and form a mapped-sentence combination. While the first POS sequence 300a and the second POS sequence 300b include shared POS tags, the first POS sequence 300a differs from and is longer than the second POS sequence 300b. This length difference comes from an additional POS tag (i.e., "NN") assigned to a term (i.e., "dust") that has been deleted from the original sentence 106*a* and is not present in the modified sentence 106*b*. Although FIG. 3A represents two examples of POS sequences corresponding to a mapped-sentence combination, when applying the deterministic classification algorithm, the document-comparison system assigns POS tags and identifies POS sequences corresponding to each sentence within each mapped-sentence combination associated with compared document versions.

FIG. 3A further illustrates a named-entity tag 302*a* assigned to a term within the original sentence 106*a* (i.e., the term "Moon") and a named-entity tag 302*b* assigned to a term within the modified sentence 106*b* (i.e., the term "Moon"). As shown, the document-comparison system uses a Named Entity Recognizer or other tagger to analyze the sentences 106*a* and 106*b* and assign the named-entity tags 302*a* and 302*b* to terms within the sentences 106*a* and 106*b*. Specifically, and as shown in FIG. 3A, the document-comparison system assigns the named-entity tag 302*a* to the term "Moon" in the original sentence 106*a* and the named-entity tag 302*b* to the term "Moon" in the modified sentence 106*b* to indicate that both terms represent a specific named entity—a location. In alternative or additional embodiments, the document-comparison system analyzes multiple sentences and assigns named-entity tags to terms representing dates, persons, locations, monetary values, organizations, percentages, quantities, or times consistent with the assignment shown in FIG. 3A.

In addition to assigning tags, when applying the deterministic classification algorithm, the document-comparison system uses POS sequences, such as POS sequences 300*a* and 300*b*, to identify change types between sentences of mapped-sentence combinations. Upon identifying POS sequences, the document-comparison system compares POS sequences representing sentences of mapped-sentence combinations and determines a longest common subsequence (between POS sequences) that correspond to each mapped-sentence combination. As used herein, the term "longest common subsequence" refers to a longest sequence of common (but non-duplicative) POS tags assigned to sentences among a mapped-sentence combination.

For example, the longest common subsequence between POS sequences 300*a* and 300*b* comprises the following nine POS tags: "DT," "NNP," "VBZ," "JJ," "IN," "NN," "NN," "CC," and "NN." POS sequences 300*a* and 300*b* share two possible common subsequences of the same length, with one common subsequence including a POS tag of "NN" for the term "gorges" and one common subsequence including a POS tag of "NN" for the term "dust." While the foregoing example describes the longest common subsequence for a single mapped-sentence combination, in some embodiments, when applying the deterministic classification algorithm, the document-comparison system determines a longest common subsequence between POS sequences corresponding to each mapped-sentence combination corresponding to sentences from different document versions.

In addition to determining a longest common subsequence, when applying the deterministic classification algorithm, the document-comparison system determines a mapped-sentence similarity between sentences of a first version mapped to sentences of a second version. To determine a mapped-sentence similarity, the document-comparison system determines a length ratio of (a) a length of a longest common subsequence and (b) a length of the longer of two or more POS sequences corresponding to mapped sentences. Alternatively, the document-comparison system determines a length ratio of (a) a length in number of terms of a longest common term sequence and (b) a length in number of terms of the longer of two or more mapped sentences. Using POS sequences as an example, a length ratio of 9:10 represents a mapped-sentence similarity for the sentences 106*a* and 106*b* because the longest common subsequence (for the two sentences) comprises nine POS tags and the longer of the POS sequences 300*a* and 300*b* (i.e., first POS sequence 300*a*) comprises ten POS tags. In some embodiments, the document-comparison system determines a mapped-sentence similarity (and thus a length ratio) for each mapped-sentence combination associated with compared document versions.

In addition to determining a mapped-sentence similarity, the document-comparison system determines how to analyze (or identify changes within) sentences that form a mapped-sentence combination based in part on the mapped-sentence similarity for the sentences. According to the deterministic classification algorithm, the document-comparison system analyzes sentences that form a mapped-sentence combination differently based on an empirically determined threshold for a mapped-sentence similarity. For example, in some embodiments, the document-comparison system trains the deterministic classification algorithm with training sets of corresponding document versions that include metadata identifying changes between corresponding sentences as specific change types (e.g., as factual changes, paraphrasing changes, and/or subcategories of factual changes or paraphrasing changes). Based on the training sets of corresponding document versions, the deterministic classification algorithm empirically identifies a threshold for a length ratio of 3/4, 4/5, 7/8, 11/13, or any other length ratio, as a length ratio above or below which certain types of changes are likely to be present.

The empirically determined threshold triggers the deterministic classification algorithm to analyze mapped-sentence combinations differently. On the one hand, if the document-comparison system determines that a length ratio corresponding to a mapped-sentence combination exceeds the threshold, the document-comparison system compares terms within the sentences that form the mapped-sentence combination to identify specific types of changes. On the other hand, if the document-comparison system determines that a length ratio corresponding to a mapped-sentence combination falls below the threshold, the document-comparison system analyzes a change between the sentences for a specific type of change—that is, as part of a transformational-paraphrase category.

As noted above, depending on the mapped-sentence similarity, the document-comparison system analyzes mapped-sentence combinations differently. Based on that analysis and analysis rules set forth below, the document-comparison system identifies changes (if any) between or among sentences of a mapped-sentence combination as part of a revision category. Specifically, by applying the deterministic classification algorithm, the document-comparison system identifies changes as part of an information-insert category for changes that insert information; an information-delete category for changes that delete information; an information-modify category for changes that modify information; a lexical-paraphrase category for changes that replace a term or phrase with a synonym or that modify a style of terms or phrases (e.g., changing numerals to text); or a transformational-paraphrase category for changes that reorder terms or phrases. If the sentences of a mapped-sentence combination include no changes or an unidentified change, the document-comparison system does not identify a change between or among such sentences as part of the foregoing revision categories.

As suggested above, some of the revisions categories are subcategories of factual changes or subcategories of paraphrasing changes. Specifically, the information-insert category, information-delete category, and information-modify category are subcategories of factual changes. Conversely, the lexical-paraphrase category and transformational-paraphrase category are subcategories of paraphrasing changes. Accordingly, when the document-comparison system identifies a change as part of one of the revision categories, it likewise identifies the change as a factual change or a paraphrasing change. The following paragraphs describe how the document-comparison system determines whether a change is part of one of the revision categories based on analysis rules.

When the document-comparison system determines that a mapped-sentence similarity corresponding to a mapped-sentence combination exceeds a threshold, the document-comparison system compares terms within the sentences that form the mapped-sentence combination according to analysis rules. In following the analysis rules, the document-comparison system groups together terms of a sentence (i) that are assigned the same or similar POS tags, (ii) that are separated by punctuation marks (e.g., commas or semicolons), and (iii) that have a coordinating conjunction (e.g., the terms "and," "nor," "or") inserted within the terms assigned the same or similar POS tags. Terms extracted from a sentence that satisfy (i), (ii), and (iii) form a grouped set (e.g., a grouped set comprising the terms "craters," "gorges," "mountains," and "dust" from the original sentence 106a). The document-comparison system treats the order of terms in a grouped set as interchangeable.

In addition to grouping terms, and as part of the analysis rules, the document-comparison system compares terms of a mapped-sentence combination corresponding to a longest common subsequence. When the document-comparison system determines that a term associated with a POS sequence corresponding to the longest common subsequence differs from a corresponding term associated with another POS sequence corresponding to the longest common subsequence, the document-comparison system determines whether the term and the corresponding term are synonyms (e.g., determining whether the term "gorges" from the original sentence 106a differs from the corresponding term "canyons" from the modified sentence 106b). The document-comparison system identifies such changes that replace the term with a synonym as part of the lexical-paraphrasing category. In other words, synonym changes from a term (associated with a POS sequence corresponding to the longest common subsequence) to a corresponding term (associated with another POS sequence corresponding to the longest common subsequence) are lexical-paraphrasing changes.

Conversely, and as part of the analysis rules, the document-comparison system identifies changes that replace the term with a non-synonym as part of the information-modify category (e.g., replacing the term "mountains" with the term "rocks"). In some such embodiments, the document-comparison system identifies changes from one named entity (which is assigned a named-entity tag) to another named entity (which is also assigned a named-entity tag) as part of the information-modify category (e.g., a change of the name "Bill" to "Ted" or of the place "park" to "pool"). In other words, non-synonym changes from a named entity (associated with a POS sequence corresponding to the longest common subsequence) to another named entity (associated with another POS sequence corresponding to the longest common subsequence) are information-modify changes.

In addition to identifying synonym and non-synonym changes, and as part of the analysis rules, the document-comparison system determines a symmetric difference between terms that form grouped sets corresponding to a mapped-sentence combination. The term "symmetric difference" refers to a number of terms that are present in either of two grouped sets but are not common between the two grouped sets—that is, the number of unique terms between grouped sets of a mapped-sentence combination. If the document-comparison system determines that the symmetric difference is zero between terms of a first grouped set (extracted from one sentence of the mapped-sentence combination) and terms of a second grouped set (extracted from another sentence of the mapped-sentence combination), the document-comparison system determines that the portions of the mapped-sentence combination that satisfy (i), (ii), and (iii) include no factual changes or paraphrasing changes.

As also part of the analysis rules, if the document-comparison system determines that the symmetric difference is greater than zero between terms of a first grouped set (from one sentence of the mapped-sentence combination) and terms of a second grouped set (from another sentence of the mapped-sentence combination), the document-comparison system compares (A-B) and (B-A). In such comparisons, A and B represent the grouped sets extracted from the sentences of the mapped-sentence combination. When the first grouped set and the second grouped set include the same or similar named-entity tags (e.g., a tag for a term representing a person, organization, or location) but different terms corresponding to the named-entity tags, the document-comparison system identifies a change between the first grouped set and the second grouped set as part of the information-modify category (e.g., a change of the term "Jupiter" from the first grouped set to the term "Mars" in the second grouped set).

Similarly, as part of the analysis rules, when the first grouped set and the second grouped set include the same or similar POS tags, lack named-entity tags, and include different terms corresponding to the POS tags, the document-comparison system identifies a change between the first grouped set and the second grouped set as part of the information-modify category (e.g., a change of one term from the first grouped set to another term in the second grouped set).

In some such embodiments, as part of the analysis rules, when the first grouped set and the second grouped set include the same or similar POS tags, lack named-entity tags, and include different terms corresponding to the POS tags, the document-comparison system further determines whether terms assigned the same or similar POS tag are synonyms. In such cases, the document-comparison system identifies changes that replacing a term assigned a POS tag with a synonym assigned a same or similar POS tag as part of the lexical-paraphrasing category.

As also part of the analysis rules, when one grouped set includes a term that does not exist in the corresponding grouped set, the document-comparison system identifies a change between the first grouped set and the second grouped set as part of the information-insert category or information-delete category (e.g., an insertion or deletion of one term from the first grouped set). Specifically, the document-comparison system identifies the change as part of the information-insert category when a first sentence lacks a term but a second sentence includes the term. Conversely, the document-comparison system identifies the change as part of the information-delete category when a first sentence includes a term but a second sentence lacks the term.

Similarly, and as part of the analysis rules, when a term from a sentence of a mapped-sentence combination does not correspond to a POS tag in a longest common subsequence for the mapped-sentence combination, the document-comparison system identifies a change between sentences of the mapped-sentence combination as part of the information-insert category or information-delete category. Specifically, the document-comparison system identifies the change as part of the information-delete category when (a) a term in a first sentence of a mapped-sentence combination does not correspond to a POS tag in the longest common subsequence and (b) the term is not present in a second sentence of the mapped-sentence combination. Conversely, the document-comparison system identifies the change as part of the information-insert category when (a) a term in a second sentence of a mapped-sentence combination does not correspond to a POS tag in the longest common subsequence and (b) the term is not present in a first sentence of the mapped-sentence combination.

As noted above, when applying the deterministic classification algorithm, the document-comparison system relies on an empirically determined threshold to identify transformational-paraphrase changes (or changes that are part of a transformational-paraphrase category). Specifically, and as part of the analysis rules, if the document-comparison system determines that a length ratio corresponding to a mapped-sentence combination falls below the threshold, the document-comparison system analyzes a verb sequence within each of a sentence and another sentence of the mapped-sentence combination.

As used herein, the term "verb sequence" refers to POS tags corresponding to a subject, verb, and object within a POS sequence. In some instances, verb sequences include more than one POS tag for a subject, verb, or object. As shown in FIG. 3A, for example, the POS tags "NNP," "VBZ," "NN," "NN," "NN," and "NN" form a verb sequence within the first POS sequence 300a. Conversely, the POS tags "NNP," "VBZ," "NN," "NN," and "NN" form a verb sequence within the second POS sequence 300b. In some instances, the verb sequence also includes a named-entity tag for a subject or object. For example, a verb sequence may include the named-entity tags 302a and 302b shown in FIG. 3A. As part of the analysis rules, the document-comparison system compares a number of POS tags (and/or named-entity tags) within verb sequences of a mapped-sentence combination, such as the first POS sequence 300a and the second POS sequence 300b. Based on the heuristics of change between the verb sequences—that is, changes between POS tags or named-entity tags of verb sequences within the POS sequences of a mapped-sentence combination—the document-comparison system identifies (or does not identify) a transformational paraphrase, such as a change from active to passive voice or a change that reorders terms or a phrase within a sentence.

FIG. 3B illustrates an application of the deterministic classification algorithm. Specifically, FIG. 3B illustrates a comparison sentence 304 in which the document-comparison system identifies changes 306a and 306b as part of the lexical-paraphrasing category and the information-delete category, respectively. To reflect that identification, the document-comparison system assigns a revision label 308a to the change 306a (i.e., changing the term "gorges" to "canyons") and a revision label 308b to the change 306b (i.e., deleting the term "dust"). While the comparison sentence 304 and the revision labels 308a and 308b represent sentences and revision labels that a document comparison may include, the document-comparison system may assign revision labels representing any revision category.

As suggested by FIG. 3B, the document-comparison system also determines that the mapped-sentence similarity for the sentences 106a and 106b exceed a threshold. For example, the document-comparison system determines that a length ratio of 9:10 (for a mapped-sentence combination corresponding to the sentences 106a and 106b) exceeds an empirically determined threshold of a length ratio (e.g., a length ratio of 3/4, 7/8, 0.73485, or any other ratio). Based on determining that the length ratio exceeds the threshold, the document-comparison system compares terms within the sentences 106a and 106b.

In particular, the document-comparison system compares terms of the mapped-sentence combination corresponding to the longest common subsequence: "DT," "NNP," "VBZ," "JJ," "IN," "NN," "NN," "CC," and "NN." By doing so, the document-comparison system detects that the terms "gorges" and "dust" from the original sentence 106a differ from the term "canyons" from the modified sentence 106b. Using WordNet, the document-comparison system then determines that the term "canyons" from the modified sentence 106b is one of the top synonyms of (and has replaced) the term "gorges" from the original sentence 106a—but that the term "canyons" is not a top synonym (or a synonym) of the term "dust." Based on determining the terms "gorges" and "canyons" are synonyms, the document-comparison system identifies the change 306a as a lexical-paraphrasing change and assigns the revision label 308a.

Additionally, as suggested by FIG. 3B, the document-comparison system groups together the terms from the original sentence 106a and the modified sentence 106b that satisfy (i), (ii), and (iii) as grouped sets. In this particular example, the document-comparison system groups together the terms "craters," "gorges," "mountains," and "dust" from the original sentence 106a as a first grouped set and the terms "craters," "canyons," and "mountains" from the modified sentence 106b as a second grouped set—because the terms are (i) each assigned the POS tag "NN," (ii) separated by a comma, and (iii) have the term "and" inserted within them. After grouping such terms together as grouped sets, the document-comparison system determines the symmetric difference between the first grouped set (i.e., the terms "craters," "gorges," "mountains," and "dust" from the original sentence 106a) and the second grouped set (i.e., the terms "craters," "canyons," and "mountains" from the modified sentence 106b).

Upon determining that the symmetric difference between the first grouped set and the second grouped set is greater than zero, the document-comparison system analyzes which terms are in one grouped set but not in the other grouped set. Specifically, the document-comparison system determines that the terms "gorges" and "dust" are present in the first grouped set but not in the second grouped set and that the term "canyons" is present in the second grouped set but not in the first grouped set. Having previously determined that "gorges" and "canyons" are synonyms, the document-comparison system determines that the change of the term "gorges" in the original sentence 106a to the term "canyons" in the modified sentence 106b is not an information-delete change. Based on determining that the term "dust" is present in the first grouped set but not in the second grouped set—and that "dust" lacks a corresponding synonym in the second grouped set—the document-comparison system identifies the deletion of the term "dust" as an information-delete change and assigns the revision label 308b to the change 306b.

For purposes of clarity, the foregoing paragraphs describe changes between sentences of a single mapped-sentence combination as part of a revision category. In some embodiments, when applying the deterministic classification algorithm, however, the document-comparison system analyzes and identifies changes between sentences of multiple mapped-sentence combinations as part of one or more revision categories—depending on the number of mapped-sentence combinations identified from different document versions. For example, the document-comparison system analyzes each mapped-sentence combination from the first digital version 100*a* and the second digital version 100*b* and (when a change satisfies the analysis rules of the deterministic classification algorithm) identifies changes between sentences of the mapped-sentence combinations as part of a revision category.

As indicated above, when applying the deterministic classification algorithm, such as that applied in FIGS. 3A and 3B, the document-comparison system may not identify a change type or may reach an inconclusive identification of a change between sentences of a mapped-sentence combination. For example, the deterministic classification algorithm may not detect a change of terms from active voice to passive voice or certain information-modify changes (e.g., multiple information-modify changes in a sentence of a second version).

In such cases, the document-comparison system optionally applies both a deterministic classification algorithm and a supervised classification algorithm to mapped-sentence combinations to identify one or more changes between sentences of a first version and sentences of a second version as factual changes or paraphrasing changes. In some such embodiments, the document-comparison system applies the supervised classification algorithm to unidentified mapped-sentence combinations that include changes the deterministic classification algorithm did not identify. In other words, the document-comparison system inputs unidentified mapped-sentence combinations (e.g., $S_i$, $S_j$) into a supervised classification algorithm and outputs an identification of a factual change or a paraphrasing change for the unidentified mapped-sentence combinations (e.g., using a factual change label or paraphrasing change label).

Alternatively, in some embodiments, the document-comparison system applies a supervised classification algorithm to mapped-sentence combinations without the deterministic classification to identify one or more changes between sentences of a first version and sentences of a second version as factual changes or paraphrasing changes. In some such embodiments, the document-comparison system applies the supervised classification algorithm to each mapped-sentence combination corresponding to sentences from different document versions. In other words, the document-comparison system inputs each mapped-sentence combination of sentences mapped between a first version and a second version (e.g., $S_i$, $S_j$) into the supervised classification algorithm and outputs an identification of a factual change or a paraphrasing change for each mapped-sentence combination (e.g., using a factual-change label or paraphrasing-change label).

In embodiments that apply the supervised classification algorithm without the deterministic classification algorithm, the document-comparison system assigns a POS tag to each term within sentences of mapped-sentence combinations. When assigning POS tags, the document-comparison system may use any of the techniques described above, such as using a POS Tagger. Additionally, in some such embodiments, the document-comparison system also assigns named-entity tags to certain terms within sentences of mapped-sentence combinations, such as terms representing dates, persons, locations, monetary values, organizations, percentages, quantities, or times. When assigning named-entity tags, the document-comparison system may use any of the techniques described above, such as using a Named Entity Recognizer or a tagger that assigns named-entity tags.

In contrast to the deterministic classification algorithm, the supervised classification algorithm identifies mapped-sentence combinations as including factual changes or paraphrasing changes rather than identifying individual changes between sentences of a mapped-sentence combination as part of a revision category. In other words, the supervised classification algorithm identifies a single type of change (either factual change or paraphrasing change) for a mapped-sentence combination rather than identifying a type of change for every change between sentences of a mapped-sentence combination.

When sentences of a mapped-sentence combination include both factual and paraphrasing changes, however, the supervised classification algorithm optionally identifies the changes between such sentences as a factual change, not a paraphrasing change. By doing so, the supervised classification algorithm weights factual changes more heavily than paraphrasing changes based on the assumption that factual changes are more important to a reviewer. Alternatively, in some embodiments, the supervised classification algorithm places more weight on paraphrasing changes.

Regardless of the weight applied to factual changes or paraphrasing changes, in some embodiments, the document-comparison system applies a support vector machine ("SVM") classifier as the supervised classification algorithm. For instance, in some embodiments, the document-comparison system uses a radial kernel to train the SVM classifier. When training the SVM classifier, the document-comparison system trains the SVM classifier using corresponding sentences, such as mapped-sentence combinations, that have been identified as including factual changes or paraphrasing changes (e.g., identified by annotators). During the training, the SVM classifier learns to identify corresponding sentences that include factual changes or paraphrasing changes based on sentence features of corresponding sentences, including, but not limited to character-level features, term-level features, tag features, and term-count features of the corresponding sentences. Each of the sentence features are explained below.

After training the SVM classifier, the document-comparison system applies the SVM classifier to identify mapped-sentence combinations as including factual changes or paraphrasing changes based on one or more of the sentence features. For example, by analyzing character-level features of a mapped-sentence combination, the SVM classifier analyzes one or more of (a) a number of additions and/or deletions of numeric digits between sentences of a mapped-sentence combination, (b) a number of additions and/or deletions of letters between sentences of a mapped-sentence combination, and (c) any differences in sentence length between the sentences of a mapped-sentence combination (e.g., differences in number of letters and/or numeric digits between sentences, differences in number of terms between sentences).

Similarly, by analyzing term-level features of a mapped-sentence combination, the SVM classifier analyzes one or more of (a) a word-level-edit distance between sentences of a mapped-sentence combination and (b) a word-level-edit distance between a lemmatized sentence (e.g., a lemmatized original sentence) from a first version and an additional sentence (e.g., revised sentence) from a second version, where the lemmatized sentence and the additional sentence form the mapped-sentence combination. The term "word-level-edit distance" refers to a minimum number of changes to transform one sentence into another sentence. For example, by one measurement, the word-level-edit distance between the original sentence 106a and the modified sentence 106b is three because transforming the original sentence 106a into the modified sentence 106b requires one term change (i.e., changing the term "gorges" to "canyons"), one term deletion (i.e., deleting the term "dust"), and one term relocation (i.e., moving the conjunction "and" from between the terms "mountains" and "dust" to between the terms "canyons" and "mountains").

Additionally, by analyzing tag features of a mapped-sentence combination, the SVM classifier analyzes one or more of (a) an edit distance between POS sequences corresponding to the sentences that form the mapped-sentence combination, (b) a number of deletions and/or insertions of each named-entity tag in each sentence that form part of the mapped-sentence combination, (c) a number of equal named-entity tags between sentences that form the mapped-sentence combination (e.g., a number of "person" tags in one sentence that have corresponding "person" tags in another sentence), and (d) a number of equal POS tags between sentences that form the mapped-sentence combination (e.g., a number of "NN" POS tags in one sentence that have corresponding "NN" POS tags in another sentence). An "edit distance" between POS sequences refers to a minimum number of changes to POS tags to transform one POS sequence into another POS sequence. For example, by one measurement, the edit distance between the first POS sequence 300a and the second POS sequence 300b is one because transforming the first POS sequence 300a into the second POS sequence 300b requires one POS-tag deletion (i.e., deleting one of the "NN" POS tags).

Finally, by analyzing term-count features of a mapped-sentence combination, the SVM classifier analyzes one or more of (a) sentence polarity as measured by a difference in a number of negative terms among sentences of a mapped-sentence combination (e.g., a difference in number of the term "bad" or "horrid" among sentences) and a difference in a number of positive terms among sentences of a mapped-sentence combination (e.g., a difference in number of the term "good" or "beautiful" among sentences) and (b) a difference in a number of nouns and pronouns among sentences of a mapped-sentence combination (e.g., a total number of two proper nouns for "Bill" and "Tonya" in one sentence versus a total number of one proper noun for "Bill" in another sentence). As for this latter analysis, the difference in a number of nouns and pronouns accounts for when a sentence replaces a noun with an appropriate pronoun to refer to the noun in a previous sentence. The SVM classifier is more likely to identify mapped-sentence combinations that include such changes as paraphrasing changes.

FIG. 4 illustrates an application of an SVM classifier. Specifically, FIG. 4 illustrates a comparison sentence 400 that represents a comparison of the sentence 112a of the first digital version 100a (or "original sentence 112a" when referred to separately) and the sentence 112b of the second digital version 100b (or "modified sentence 112b" when referred to separately). Based on applying the SVM classifier, the document-comparison system identifies the changes between the original sentence 112a and the modified sentence 112b as paraphrasing changes. To reflect that identification, the document-comparison system assigns a revision label 402 to the mapped-sentence combination corresponding to the comparison sentence 400.

In particular, the document-comparison system applies the SVM classifier to analyze the character-level features, the term-level features, the tag features, and the term-count features of the sentences 112a and 112b. As for the character-level features, the SVM classifier determines that there are no additions or deletions of numeric digits, that there are a total number of six deleted letters from the original sentence 112a to the modified sentence 112b, and that the original sentence 112a is six letters (or alternatively two words) longer than the modified sentence 112b. As for the term-level features, the SVM classifier determines that the word-level-edit distance between the original sentence 112a and the modified sentence 112b is nine based on three deletions, four relocated terms, and two capitalizations.

Additionally, as for the tag features, the SVM classifier determines that the edit distance between POS sequences corresponding to the sentences 112a and 112b is seven based on three relocated POS tags, one changed POS tag, and three deleted POS tags; that the there are no deletions or insertions of named-entity tags; that there are three equal named-entity tags between the sentences 112a and 112b (i.e., equal named-entity tags for the terms "Buzz," "Aldrin's," and "Moon"); and that there are ten equal POS tags between the sentences 112a and 112b. Finally, as for the term-count features, the SVM classifier determines that a difference in negative words between the sentences 112a and 112b is one (i.e., the original sentence 112a includes the term "cannot" while the modified sentence 112b does not include the term "cannot"), a difference of zero positive words between the sentences 112a and 112b, and a difference of zero in a number of nouns and pronouns. Based on each of these sentence features, the SVM classifier identifies the mapped-sentence combination corresponding to the sentences 112a and 112b as including a paraphrasing change and assigns the revision label 402 accordingly.

For purposes of clarity, the foregoing paragraphs describe identifying a change type for a single mapped-sentence combination. In some embodiments, when applying a supervised classification algorithm, however, the document-comparison system analyzes and identifies multiple mapped-sentence combinations as including a change type. This may be based on the number of mapped-sentence combinations from different document versions that the deterministic classification algorithm does not identify or the number of total mapped-sentence combinations. For example, in some embodiments, the document-comparison system analyzes mapped-sentence combinations corresponding to the sentences 106a and 106b and the sentences 112a and 112b and (based on sentence features) identifies changes the mapped-sentence combinations as including paraphrasing changes.

As described in the overview, in addition to identifying changes made between document versions as specific change types, in some embodiments, the document-comparison system ranks revised sentences that include changes made between document versions. For example, in some instances, the document-comparison system determines a relative importance of each revised sentence that includes changes from one document version to another document version. By ranking revised sentences, the document-comparison system identifies changes that may be of most interest to a reviewer and enables filtering functions to review revised sentences of a certain ranking.

As suggested in the overview, when determining a relative importance of revised sentences, the document-comparison system generates a composite-importance score for each revised sentence from a set of revised sentences. A "composite-importance score" refers to a score that represents an overall importance of a revised sentence relative to other revised sentences. In some embodiments, the document-comparison system generates a composite-importance score for each revised sentence within a second version of a document. Alternatively, the document-comparison system generates a composite-importance score for each revised sentence within a chapter, section, paragraph, or other portion of a second version of a document.

To generate a composite-importance score, the document-comparison system optionally generates a change-importance score and a sentence-importance score. In such embodiments, the composite-importance score for each revised sentence represents a weighted sum of a change-importance score and a sentence-importance score. A composite-importance score can, however, be based exclusively on either a change-importance score for a revised sentence (without a sentence-importance score) or a sentence-importance score for a revised sentence (without a change-importance score). A "change-importance score" measures the importance of a change made between sentences of a mapped-sentence combination, such as a change made between a sentence of a first version and one or more corresponding sentences of a second version. In some embodiments, the document-comparison system bases a change-importance score on various factors described below. A "sentence-importance score" measures the importance of a revised sentence relative to other revised sentences. In some embodiments, the document-comparison system bases a sentence-importance score on various factors described below.

As mentioned above, the document-comparison system optionally generates a change-importance score based on various factors. For instance, in some embodiments, the document-comparison system generates a change-importance score based on one or more of a type-of-change factor, a named-entity factor, and a number-of-changes factor. The following paragraphs describe each such factor.

A type-of-change factor accounts for factual changes or paraphrasing changes within a revised sentence. For example, a type-of-change factor may represent a weighted number of certain change types, such as a weighted count of factual changes and a weighted count of paraphrasing changes. In some such embodiments, the document-comparison system weights a factual change more heavily than a paraphrasing change (e.g., assigning a weight of 0.75 to a factual change and a weight of 0.10 to a paraphrasing change). The document-comparison system optionally weights each of the subcategories of factual changes equally (i.e., by weighting the information-delete, information-insert, and information-modify categories equally) or weights the subcategories of factual changes differently (e.g., by weighting the information-insert category more heavily than the information-delete and information-modify categories).

In some embodiments, however, the document-comparison system weights a paraphrasing change more heavily than a factual change (e.g., assigning a weight of 0.75 to a paraphrasing change and a weight of 0.10 to a factual change). In such embodiments, the document-comparison system optionally weights each of the subcategories of paraphrasing changes equally (i.e., by weighting the lexical-paraphrasing and transformational-paraphrasing categories equally) or weights the subcategories of factual changes differently (e.g., by weighting the lexical-paraphrasing category more heavily than the transformational-paraphrasing category).

Additionally, a named-entity factor accounts for changes to named entities within a revised sentence. For example, a named-entity factor may represent a weighted number of changes to named entities assigned a named-entity tag and a weighted number of changes to non-named entities assigned a POS tag. Accordingly, a named-entity factor optionally differentiates between changes to named entities and changes to non-named entities within a revised sentence. In some embodiments, the document-comparison system weights a change to a named entity (e.g., a person, location, organization, or date with an associated named-entity tag and a POS tag) more heavily than a change to a non-named entity (e.g., a verb, noun, conjunction, adjective, preposition with an associated POS tag but without a named-entity tag). For example, the document-comparison system assign a weight of 0.80 to a change to a named entity and a weight of 0.20 to a change to a non-named entity.

In addition to the type-of-change factor and the named-entity factor, a number-of-changes factor measures a number of changes within a revised sentence. In some such embodiments, the document-comparison system uses the word-level-edit distance to quantify a number of changes within the revised sentence. Alternatively, in some embodiments, the document-comparison system uses a character-level-edit distance to quantify a number of changes within the revised sentence. Additionally, in some embodiments, the document-comparison system includes a weight as part of the number-of-changes factor.

As noted above, in some embodiments, the document-comparison system generates a change-importance score based on one or more of a type-of-change factor, a named-entity factor, or a number-of-changes factor. For example, in some such embodiments, the document-comparison system generates a change-importance score for each of a set of revised sentences according to the following function:

$$\text{ChangeImportance}(S_i') = w_1 * (\text{no. of Factual Changes}) + w_2 * (\text{no. of Paraphrasing Changes}) + w_3 * (\text{no. of NE changes}) + w_4 * (\text{no. of POS changes}) + w_5 * \text{EditDistance}_{word}(S_i, S_i') \quad (4)$$

In function (4), $w_1$ represents a weight that multiplies the number of factual changes, $w_2$ represents a weight that multiplies the number of paraphrasing change, $w_3$ represents a weight that multiplies the number of named-entity changes, $w_4$ represents a weight that multiplies a number of changes to POS tags, and $w_5$ represents a weight that multiplies a word-level-edit distance for a revised sentence.

As indicated by function (4), the change-importance score for a revised sentence ($S_i'$) equals the sum of a type-of-change factor ($w_1$*(no. of Factual Changes)+$w_2$ (no. of Paraphrasing Changes)), a named-entity factor ($w_3$*(no. of NE changes)+$w_4$*(no. of POS changes)), and a number-of-changes factor ($w_5$ EditDistance$_{word}$ ($S_i$, $S_i'$)).

In some embodiments, the document-comparison system trains a linear regression model to generate the various weights in function (4). For example, the document-comparison system optionally uses a set of corresponding sentences that annotators have ranked based on the relative importance of the changes represented by the corresponding sentences. By inputting the set of corresponding sentences into the linear regression model, the model generates the various weights shown in function (4), including $w_1$, $w_2$, $w_3$, $w_4$, and $w_5$.

In addition to generating a change-importance score, in some embodiments, the document-comparison system optionally generates a sentence-importance score. In some such embodiments, the document-comparison system generates a sentence-importance score based on various factors.

For instance, the document-comparison system generates a sentence-importance score based on one or more of a sentence-position factor and a keyword-score factor. The following paragraphs describe each such factor.

A sentence-position factor represents a weight or score that accounts for a position of a revised sentence within a second version. In some embodiments, the document-comparison system weights a revised sentence occurring near a beginning of the second version more heavily than a revised sentence occurring near an end of the second version. For example, a document-comparison system may assign a sentence-position factor of 1.00 to a revised sentence that occurs at the beginning of the second version and a sentence-position factor of 0.50 to a revised sentence that occurs in the middle of the second version. Alternatively, in other embodiments, the document-comparison system weights a revised sentence occurring near an end of the second version more heavily than a revised sentence occurring near a beginning of the second version.

When the second version includes chapters, sections, or other designated portions, the document-comparison system optionally weights revised sentences relative to a revised sentence's position within its corresponding chapter, section, or other designated portion of the second version. For example, a document-comparison system may assign a sentence-position factor of 1.00 to a revised sentence that occurs at the beginning of a first section of the second version, a sentence-position factor of 1.00 to a revised sentence that occurs at the beginning of a second section of the second version, a sentence-position factor of 0.05 to a revised sentence that occurs at the end of the first section of the second version, and a sentence-position factor of 0.05 to a revised sentence that occurs at the end of the second section of the second version.

In addition to the sentence-position factor, a keyword-score factor accounts for keywords within a revised sentence. For example, in some embodiments, the document-comparison system uses a TextRank algorithm to extract keywords from a second version and score each keyword. In some such embodiments, the document-comparison system uses the TextRank algorithm described by Rada Mihalcea and Paul Tarau, "TextRank: Bringing Order into Texts," Association for Computational Linguistics (2004), the entire contents of which are hereby incorporated by reference. When using a TextRank algorithm to determine a keyword-score factor, the document-comparison system ranks each revised sentence based on a cumulative score of all keywords within a second version.

For example, the document-comparison system optionally uses the following function to determine a keyword score for a revised sentence among many revised sentences:

$$KeywordScore(S_i) = \frac{\sum_{w \in W \cap w \in S} Score(w)}{|S|} \quad (5)$$

In function (5), S represents a set of words in a revised sentence, $S_i$ represents the revised sentence, and w represents a set of keywords extracted from a second version of a document.

FIG. 5 illustrates a ranking 500 of revised sentences. As suggested by FIG. 5, the document-comparison system ranks each of the second plurality of sentences 102b that include a change, that is, sentences in the second digital version 100b that represent revised versions or inserted sentences compared to the first plurality of sentences 102a from the first digital version 100a. Specifically, the document-comparison system ranks the sentences 104b, 106b, 108b, 110b, 112b, 114b, 114c, and 116 based on relative importance.

To rank each revised sentence, the document-comparison system generates a composite-importance score for each of the sentences 104b, 106b, 108b, 110b, 112b, 114b, 114c, and 116 by determining a weighted sum of a change-importance score and a sentence-importance score for each sentence. In doing so, the document-comparison system uses equation (4) to generate a change-importance score for each of the sentences 104b, 106b, 108b, 110b, 112b, 114b, 114c, and 116 based on a type-of-change factor, a named-entity factor, and a number-of-changes factor. Additionally, the document-comparison system generates a sentence-importance score for each of the sentences 104b, 106b, 108b, 110b, 112b, 114b, 114c, and 116 based on a sentence-position factor and a keyword-score factor. For the example, and as shown in FIG. 5, the document-comparison system uses TextRank and equation (5) to generate a keyword score for the keyword-score factor.

As indicated by the ranking 500, based on the composite-importance scores, the document-comparison system ranks the added sentence 116 first, the sentence 110b second, the modified sentence 106b third, the modified sentence 112b fourth, and the sentence 108b fifth in terms of relative importance. The ranking 500 includes the revised sentences from the second digital version 100b having the five highest composite-importance scores. Although not shown, the document-comparison system also ranks the sentence 104b sixth, the sentence 114c seventh, and the sentence 114b eighth in terms of relative importance.

As indicated in the overview, in addition to identifying changes made between document versions and ranking revised sentences, the document-comparison system optionally generates a comparison of a first version and a second version of a document that identifies changes by change type or revised sentences by rank. For example, a comparison may identify factual changes separately from paraphrasing changes and paraphrasing changes separately from factual changes (e.g., by showing factual changes without paraphrasing changes). Additionally or alternatively, a comparison may separately identify changes by revision category, such as by separately showing changes that are part of an information-insert category, an information-delete category, an information-modify category, a lexical-paraphrase category, or a transformational-paraphrase category.

A comparison may use various formats to indicate changes. In some embodiments, the comparison comprises a document, such as a side-by-side comparison of the first version and the second version that highlights, marks, encloses with borders, or otherwise indicates changes between the two versions' texts. Additionally, in some embodiments, the comparison comprises a single document that includes both the unchanged text and changed text with markings that indicate how terms, phrases, or punctuation changed from the first version to the second version. Alternatively, in some embodiments, the comparison comprises a list of changes, such as a list of changes in order of occurrence within a second version that indicates a change type, a list of changes grouped by change type, or a list of revised sentences ranked by order of relative importance. In some such embodiments, the list identifies the change type with labels (e.g., labels for factual changes, paraphrasing changes, or any revision category).

A comparison may also use various options to identify changes by type or revised sentences by rank. For example, in some embodiments, a comparison comprises various filters. When the document-comparison system receives an indication that one of the filters has been selected, the document-comparison system causes a computing device to filter changes by type or rank (or revised sentences by rank) for display within a graphical user interface. Additionally, in some embodiments, a comparison comprises labels, such as the revision labels 308a and 308b illustrated in FIG. 3B. When the document-comparison system receives an indication of a user interaction with a particular change, such as a mouse hover, click, or touch gesture, the document-comparison system causes a computing device to present a label indicating a particular change type. The label may indicate a factual change or paraphrasing change, such as the revision label 402 in FIG. 4 or, more specifically, indicate a specific revision category, such as the revision labels 308a or 308b in FIG. 3B.

As noted above, the document-comparison system provides a more flexible and nuanced approach to identifying and representing changes than conventional document authoring tools. But the document-comparison system also provides a more accurate methodology for identifying factual changes or paraphrasing changes than existing approaches. For example, an embodiment of the document-comparison system more accurately identifies factual changes and paraphrasing changes than a baseline approach described by Amit Bronner and Christof Monz, "User Edits Classification Using Document Revisions Histories," Proceedings of the 13th Conference of the European Chapter of the Association for Computational Linguistics (2012) (hereinafter "Bronner"). As explained in Bronner, Bronner's baseline approach distinguishes between factual changes and paraphrasing changes based on Levenshtein distance between two sentences.

In one experiment, both Bronner's baseline approach and an embodiment of the document-comparison system analyzed a first version and a second version of forty Wikipedia articles. For each of the forty Wikipedia articles, the first version used was a then-current version of a Wikipedia article, and the second version used was an earlier version of the same Wikipedia article from the revision history. As part of this experiment, the document-comparison system applied both the deterministic classification algorithm and the supervised classification algorithm to the two versions of forty Wikipedia articles. Reviewers also manually identified paraphrasing changes and factual changes between the two versions of the forty Wikipedia articles to verify the accuracy of Bronner's baseline approach and the document-comparison system.

After applying both Bronner's baseline approach and the document-comparison system, Bronner's baseline approach accurately identified 49% of paraphrasing changes and 67% of factual changes within mapped sentences of the Wikipedia articles. By contrast, the document-comparison system accurately identified 85% of paraphrasing changes and 73% of factual changes within the same mapped sentences of the Wikipedia articles. The document-comparison system also accurately identified changes between the two versions of the Wikipedia articles as part of subcategories of paraphrasing changes and factual changes. While Bronner's baseline approach could not identify such subcategories, the document-comparison system accurately identified 76% of certain changes as part of the information-modify category, 50% of certain changes as part of the information-insert category, 71% of certain changes as part of the information-delete category, and 94% of certain changes as part of the lexical-paraphrase category.

Figure 6A:
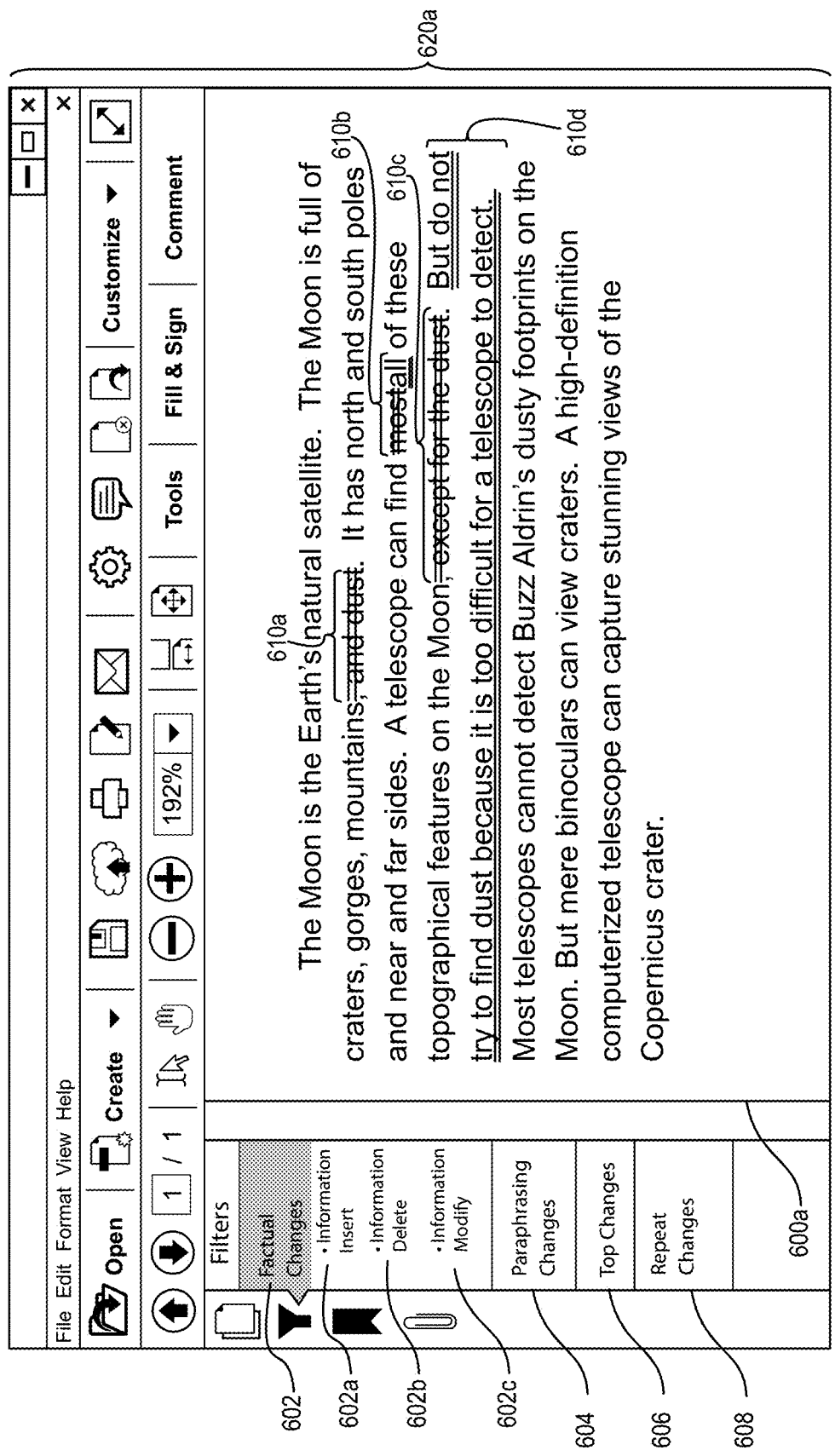
FIGS. 6A-6C illustrate document comparisons in accordance with one or more embodiments.
Figure 6B:
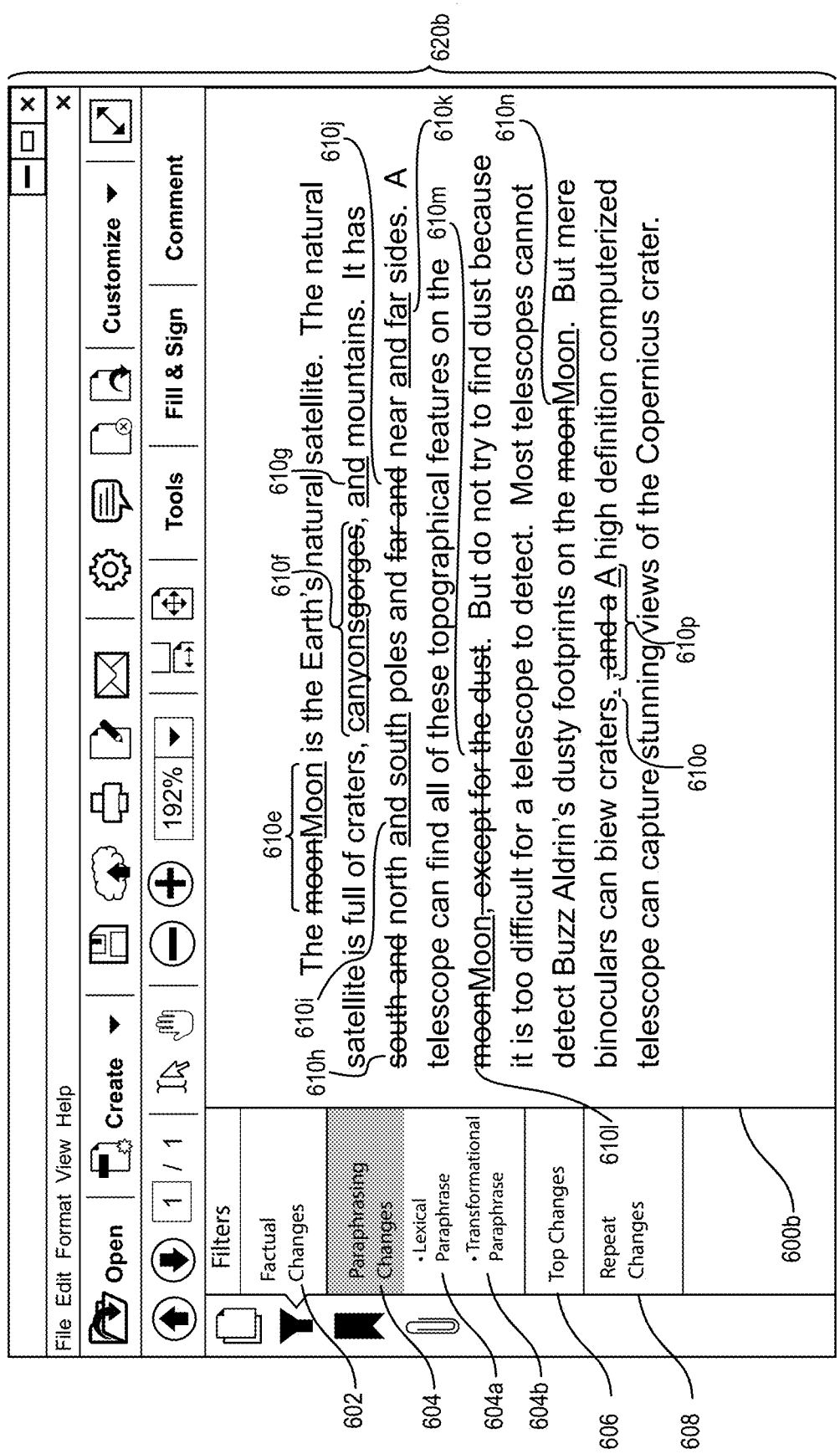
Figure 6C:
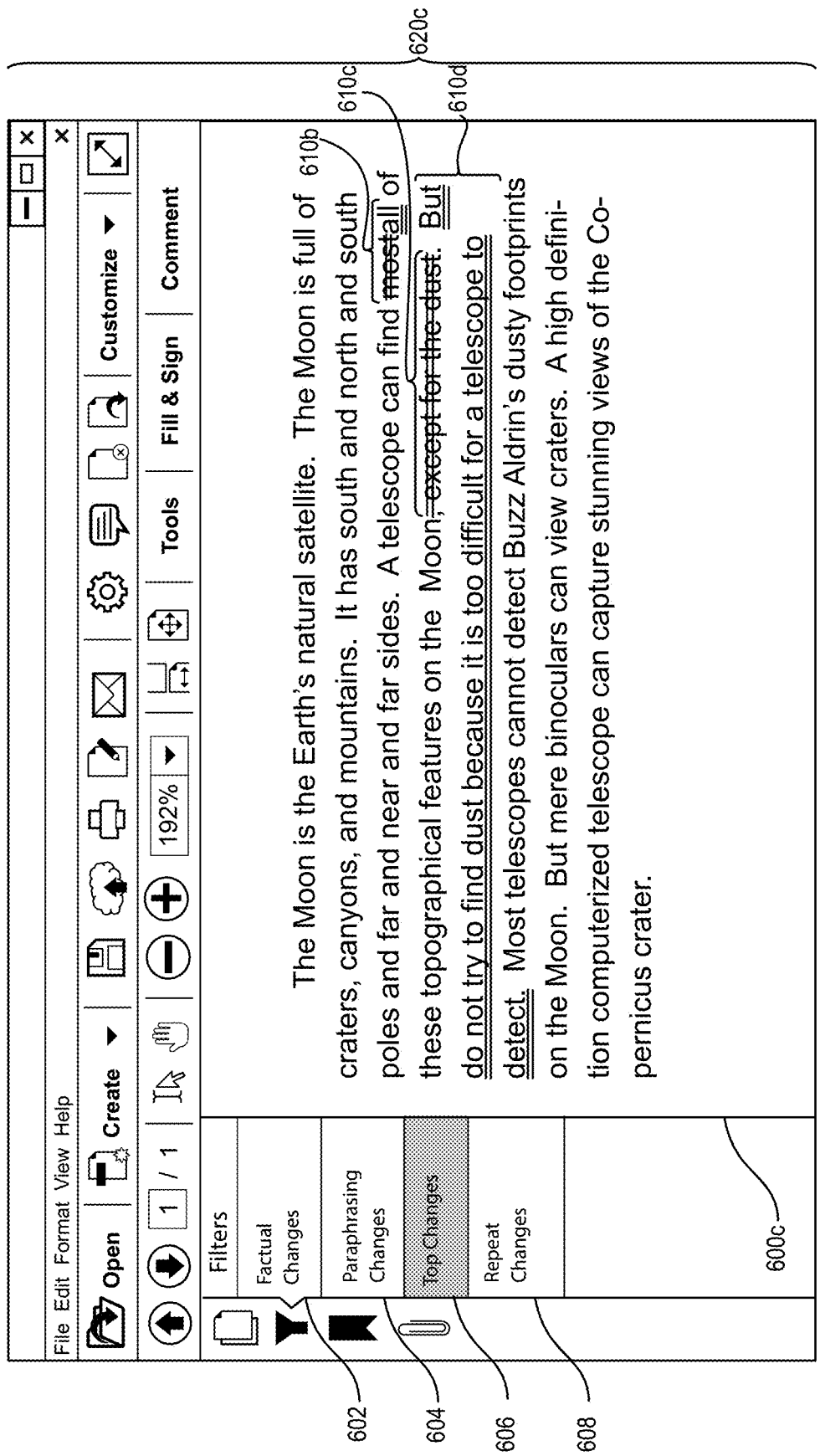

Turning back now to the figures, FIGS. 6A-6C illustrate document comparisons 600a, 600b, and 600c, respectively. A computing device presents the document comparisons 600a, 600b, and 600c respectively within graphical user interfaces 620a, 620b, and 620c. Each of the document comparisons 600a, 600b, and 600c comprise texts that appear unchanged and texts that appear changed from the first digital version 100a to the second digital version 100b. The document-comparison system identifies the changed text with markings that indicate how terms, phrases, or punctuation has changed from the first digital version 100a to the second digital version 100b. Depending on whether a factual-change filter 602, a paraphrasing-change filter 604, a top-change filter 606, or a repeat-change filter 608 is selected, the document-comparison system causes the computing device to present each of the document comparisons 600a, 600b, and 600c to indicate different types of changes within the graphical user interfaces 620a, 620b, and 620c.

As shown in FIG. 6A, the document comparison 600a includes changes 610a-610d. The document-comparison system represents the changes 610a-610d in double-strikethrough font or double-underline font to indicate that the changes 610a-610d comprise factual changes. Changes in double-strikethrough font indicate deletions, whereas changes in double-underline font represent insertions. The double-strikethrough and double-underline fonts do not by themselves, however, represent factual-change subcategories, but rather factual changes in general.

As suggested by FIG. 6A, when the document-comparison system receives an indication that a user has selected the factual-change filter 602, the document-comparison system causes the computing device to present (within the graphical user interface 620a) the document comparison 600a with the changes 610a-610d. In other words, the factual-change filter 602 triggers the document-comparison system to separately identify (and cause the computing device to present) the factual changes between the first digital version 100a and the second digital version 100b in double-strikethrough or double-underline font and without markings for paraphrasing changes.

FIG. 6A further illustrates factual-change subfilters 602a, 602b, and 602c. The factual-change subfilters 602a, 602b, and 602c function similarly to the factual-change filter 602. When the document-comparison system receives an indication that a user has selected the factual-change subfilter 602a, factual-change subfilter 602b, or factual-change subfilter 602c, the document-comparison system causes the computing device to present (within the graphical user interface 620a) the document comparison 600a with factual changes that are part of the information-insert category, information-delete category, or information-modify category, respectively. In other words, each of the factual-change subfilters 602a, 602b, and 602c trigger the document-comparison system to separately identify (and cause the computing device to present) specific changes between the first digital version 100a and the second digital version 100b that are part of a factual-change subcategory in double-strikethrough or double-underline font and without markings for other changes.

As shown in FIG. 6B, the document comparison 600b includes changes 610e-610p. The document-comparison system represents the changes 610e-610p in single-strikethrough font or single-underline font to indicate that the changes 610e-610p comprise paraphrasing changes.

Changes in single-strikethrough font indicate deletions, whereas changes in single-underline font represent insertions. The single-strikethrough and single-underline fonts do not by themselves, however, represent paraphrasing-change subcategories, but rather paraphrasing changes in general.

As suggested by FIG. 6B, when the document-comparison system receives an indication that a user has selected the paraphrasing-change filter 604, the document-comparison system causes the computing device to present (within the graphical user interface 620b) the document comparison 600b with the changes 610e-610p. In other words, the paraphrasing-change filter 604 triggers the document-comparison system to separately identify (and cause the computing device to present) the paraphrasing changes between the first digital version 100a and the second digital version 100b in single-strikethrough or single-underline font and without markings for factual changes.

FIG. 6B further illustrates paraphrasing-change subfilters 604a and 604b. The paraphrasing-change subfilters 604a and 604b function similarly to the paraphrasing-change filter 604. When the document-comparison system receives an indication that a user has selected the paraphrasing-change subfilter 604a or paraphrasing-change subfilter 604b, the document-comparison system causes the computing device to present (within the graphical user interface 620b) the document comparison 600b with paraphrasing changes that are part of the lexical-paraphrase category or transformational-paraphrase category, respectively. Accordingly, each of the paraphrasing-change subfilters 604a and 604b trigger the document-comparison system to separately identify (and cause the computing device to present) specific changes between the first digital version 100a and the second digital version 100b that are part of a paraphrasing-change subcategory in single-strikethrough or single-underline font and without markings for other changes.

As shown in FIG. 6C, the document comparison 600c includes the changes 610b, 610c, and 610d. The changes 610b, 610c, and 610d represent factual changes within revised sentences having the three highest rankings, as determined by the document-comparison system with composite-importance scores. When the document-comparison system receives an indication that a user has selected the top-change filter 606, the document-comparison system causes the computing device to present (within the graphical user interface 620c) the document comparison 600c with the changes 610b, 610c, and 610d. In other words, the top-change filter 606 triggers the document-comparison system to separately identify (and cause the computing device to present) changes within revised sentences having a certain ranking.

To determine which changes to present, the document-comparison system optionally identifies revised sentences having a composite-importance score above a threshold composite-importance score (within a version or within a chapter, section, or other portion of a version). Alternatively, the document-comparison system identifies a certain number of highly ranked revised sentences (within a version or within a chapter, section, or other portion of a version), such as the ten highest ranked revised sentences. The document-comparison system then causes a computing device to present all changes (or only certain types of changes) within the identified revised sentences. As shown in FIG. 6C, the document-comparison system causes the computing device to present the document comparison 600c with factual changes (but not paraphrasing changes) from within revised sentences having a composite-importance score above a threshold composite-importance score. Accordingly, the changes 610b, 610c, and 610d represent factual changes from revised sentences having composite-importance scores above a threshold.

Although not shown specifically, the repeat-change filter 608 functions similarly to the factual-change filter 602, paraphrasing-change filter 604, and top-change filter 606. As described above, FIG. 1C illustrates the function of a factual-change filter, such as the factual-change filter 602.

While the document-comparison system represents the factual changes and paraphrasing changes in certain strikethrough and underline fonts in FIGS. 1C, 6A, 6B, and 6C, the document-comparison system uses other markings to indicate factual changes, paraphrasing changes, or subcategories in additional or alternative embodiments. For example, the document-comparison system may use highlighting, color coding, labels, or some other marking to indicate change types.

Figure 7:
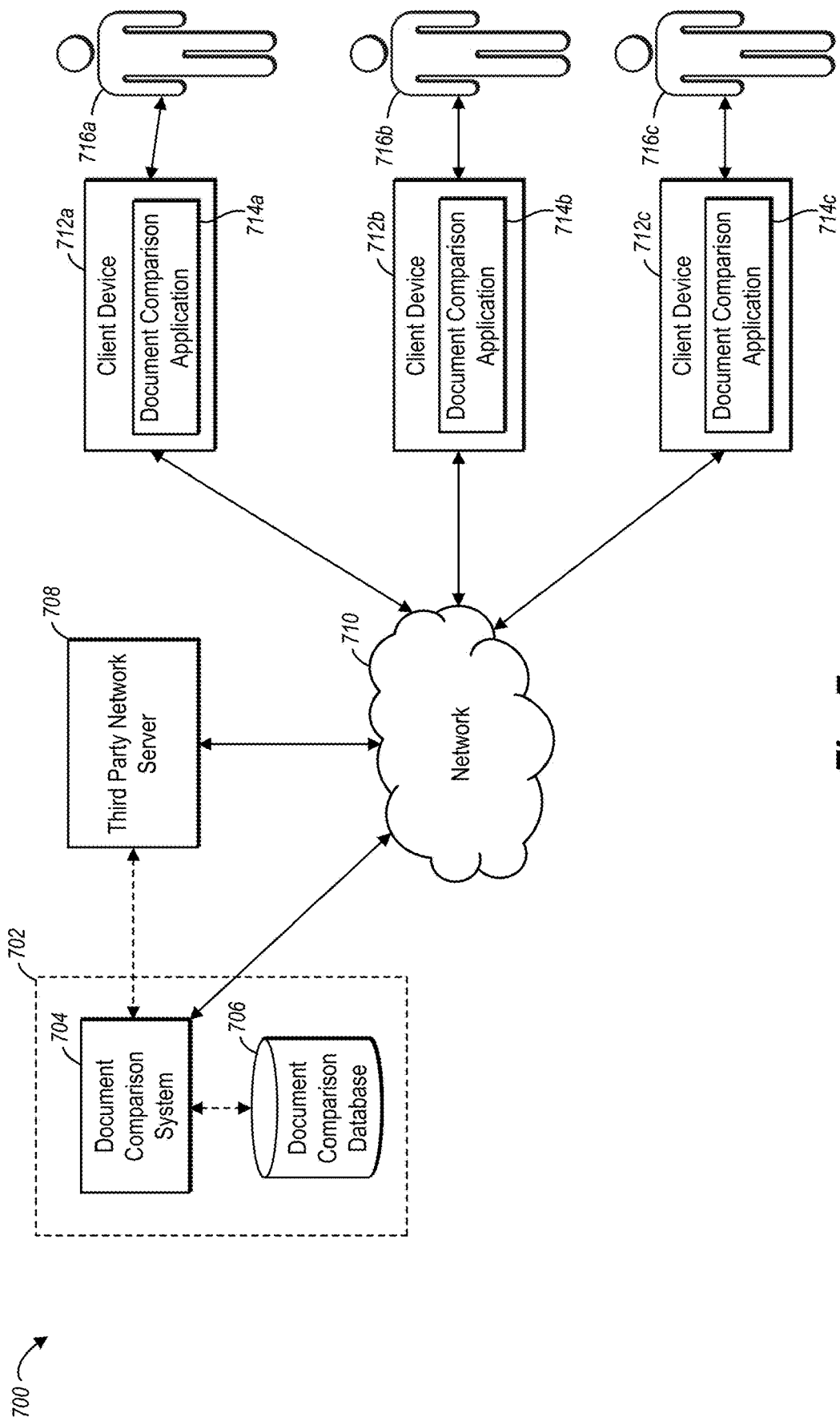
FIG. 7 illustrates a block diagram of an environment in which a document-management system can operate in accordance with one or more embodiments.
Figure 8:
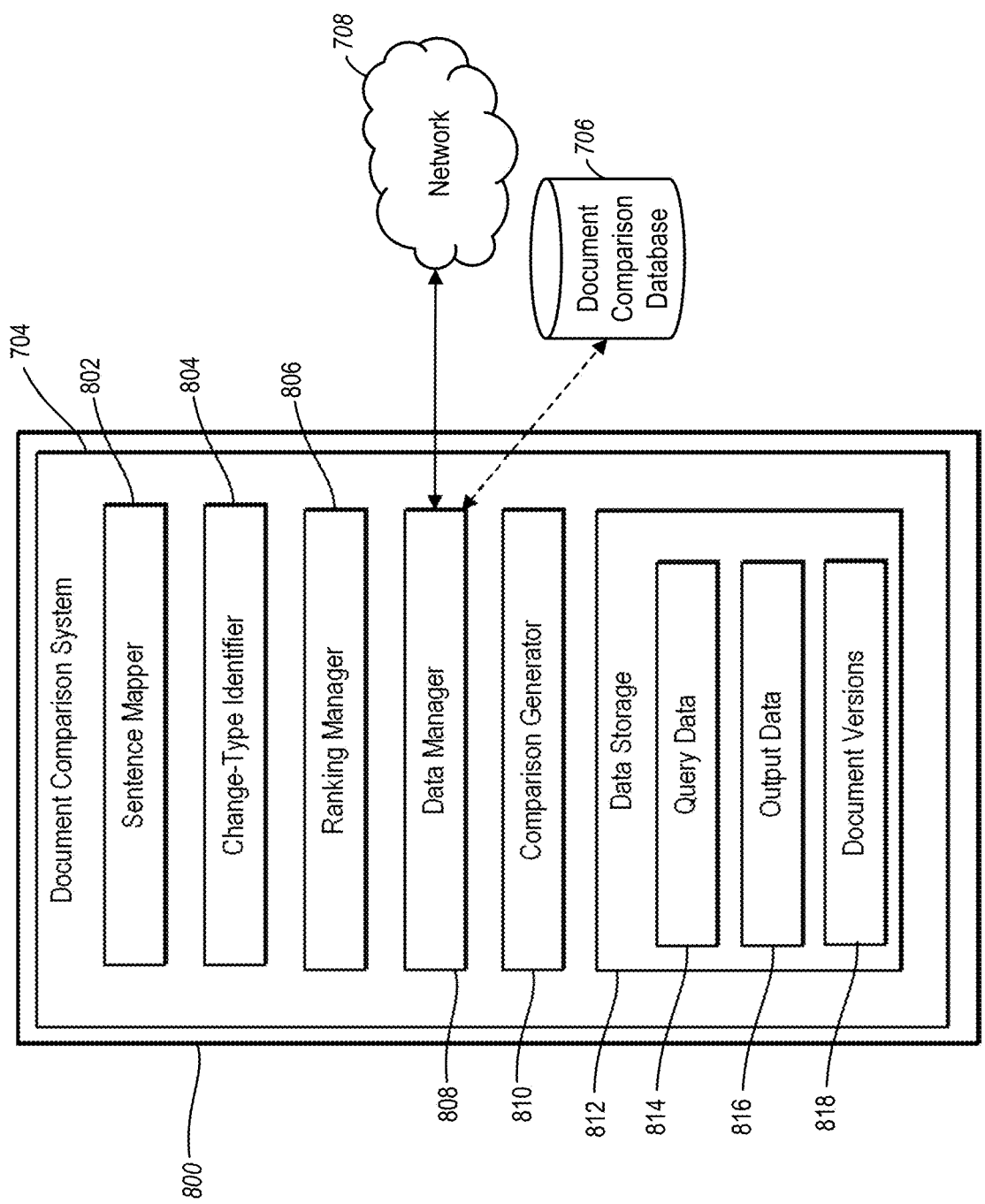
FIG. 8 illustrates a schematic drawing of a document-comparison system of FIG. 7 in accordance with one or more embodiments.

Turning now to FIGS. 7 and 8, these figures provide an overview of an environment in which a document-management system can operate and an example of an architecture for a document-comparison system. FIG. 7 is a block diagram illustrating an environment 700 in which a document-management system 702 can operate in accordance with one or more embodiments. As illustrated in FIG. 7, the environment 700 includes the document-management system 702; third-party network server(s) 708, such as web server(s); client devices 712a, 712b, and 712c; users 716a, 716b, and 716c; and a network 710, such as the Internet.

As further illustrated in FIG. 7, the client devices 712a-712c communicate through the network 710 with the third-party network server(s) 708 and, in some embodiments, the document-comparison system 704. Although FIG. 7 illustrates an arrangement of the document-management system 702, the client devices 712a-712c, the users 716a-716c, the network 710, and the third-party network server(s) 708, various additional arrangements are possible. For example, the client devices 712a-712c may directly communicate with the third-party network server(s) 708 and thereby bypass the network 710.

As shown in FIG. 7, the users 716a-716c comprise users who access one or more documents, versions of documents, or software applications provided (in whole or in part) by the third-party network server(s) 708, including the document-comparison applications 714a-714c. Additionally, the third-party network server(s) 708 provide data to the client devices 712a-712c that enable the document-comparison applications 714a-714c to access, download, upload, or compare different versions of a document and/or identify changes between document versions. While FIG. 7 illustrates three users 716a-716c, in alternative embodiments, the environment 700 includes fewer or more than three users 716a-716c. For example, in other embodiments, the environment 700 includes hundreds, thousands, millions, or billions of users.

As also shown in FIG. 7, the document-management system 702 includes the document-comparison system 704 and a document-comparison database 706. The document-comparison system 704 accesses, manages, analyzes, and queries data corresponding to some or all of the users 716a-716c, including versions of documents associated with the users 716a-716c. For example, the document-comparison system 704 accesses and analyzes documents (corresponding to some or all of the users 716a-716c) that are stored within the document-comparison database 706. Additionally, in some embodiments, the document-comparison system 704 accesses, manages, analyzes, and queries data corresponding to other users associated with the third-party network server(s) 708, such as versions of other users' documents.

In one or more embodiments, the client devices 712a-712c transmit some or all of the data (corresponding to some or all of the users 716a-716c) through the network 710 to the third-party network server(s) 708, such as when downloading documents or software applications or uploading documents. To generate the transmitted data or initiate communications, the users 716a-716c interact with the client devices 712a-712c, respectively. The client devices 712a-712c may include, but are not limited to, mobile devices (e.g., smartphones, tablets), laptops, desktops, or any other type of computing device, such as those described below in relation to FIG. 12. Similarly, the network 710 may comprise any of the networks described below in relation to FIG. 12.

In one or more embodiments, the document-comparison system 704 tracks various user data related to the communications between the client devices 712a-712c and the third-party network server(s) 708, including data associated with the document-comparison applications 714a-714c. For example, the document-comparison system 704 tracks user data that represents changes made between versions of documents by any of the users 716a-716c, changes reviewed or further changed in a comparison by the users 716a-716c, and versions of documents changed by the users 716a-716c. Alternatively, any one of the document-comparison applications 714a-714c tracks user data that represent the same actions performed by one of the associated users 716a-716c.

The document-comparison system 704 tracks user data in various ways. In one or more embodiments, the third-party network server(s) 708 tracks the user data and then reports the tracked user data to the document-comparison system 704. Alternatively, the document-management system 702 receives tracked user data directly from the client devices 712a-712c. In particular, the document-management system 702 may receive information through data stored on a client device (e.g., data associated with a document-comparison application, software application metadata, a browser cookie, cached memory), embedded computer code (e.g., tracking terms or phrases within and between document versions), a user profile, or engage in any other type of tracking technique. Accordingly, the document-comparison system 704 can receive tracked user data from the third-party network server(s) 708, the network 710, and/or the client devices 712a-712c.

As also illustrated in FIG. 7, the document-comparison system 704 is communicatively coupled to a document-comparison database 706. In one or more embodiments, the document-comparison system 704 accesses and queries data associated with one of the document-comparison applications 714a-714c from the document-comparison database 706 or sends data to the document-comparison database 706. As shown in FIG. 7, the document-comparison database 706 is separately maintained from the document-comparison system 704. Alternatively, in one or more embodiments, the document-comparison system 704 and the document-comparison database 706 comprise a single combined system, subsystem, or device.

Turning now to FIG. 8, this figure illustrates a schematic diagram of one embodiment of a computing device 800. In some embodiments, the computing device 800 is one or more servers that support the document-comparison system 704. In other embodiments, the computing device 800 is one of the client devices 712a-712c. As the computing device 800 suggests, in some embodiments, the client devices 712a-712c comprise the document-comparison system 704 or portions of the document-comparison system 704. In particular, in some instances, the client devices 712a-712c respectively use the document-comparison applications 714a-714c to perform the functions described above by the document-comparison system 704. In other words, in some embodiments, the client devices 712a-712c comprise a document-comparison system.

As shown, the computing device 800 includes the document-comparison system 704 and is communicatively coupled to both the network 710 and the document-comparison database 706. The document-comparison system 704 in turn includes, but is not limited to, a sentence mapper 802, a change-type identifier 804, a ranking manager 806, a data manager 808, a comparison generator 810, and a data storage 812. In some embodiments, the document-management system 702 includes or is coupled to the document-comparison database 706, as indicated by the dotted line in FIG. 8.

As shown in FIG. 8, the sentence mapper 802 maps sentences within different versions of a document. Consistent with the disclosure above, the sentence mapper 802 determines which sentences in a first version correspond to which sentences in a second version. When doing so, in some embodiments, the sentence mapper 802 generates a TF-IDF for each sentence of a first version and each sentence of a second version using function (1), measures similarity between sentences within the first version and second version by generating sentence-similarity scores using function (2), generates a sentence matrix using function (3), and/or charts a path through the sentence matrix that maximizes a sum of function (3). Additionally, in some embodiments, the sentence mapper 802 tags each sentence of a first version and each sentence of a second version with at least one of an add tag, delete tag, keep tag, or modify tag to facilitate mapping sentences.

As also shown in FIG. 8, the change-type identifier 804 identifies changes between mapped sentences of a first version and a second version as factual changes or paraphrasing changes. In some such embodiments, the change-type identifier 804 also identifies changes between mapped sentences as part of a specific revision category, including the information-insert, information-delete, information-modify, lexical-paraphrase, and transformational-paraphrase categories. Consistent with the disclosure above, in some embodiments, the change-type identifier 804 applies a deterministic classification algorithm and/or a supervised classification algorithm to identify changes between mapped sentences of a first version and a second version as factual changes or paraphrasing changes or subcategories of factual changes or paraphrasing changes.

Additionally, and as shown in FIG. 8, the ranking manager 806 ranks revised sentences that include changes made between document versions. For example, in some instances, the ranking manager 806 determines a relative importance of each revised sentence that includes changes from one document version to another document version. In some such embodiments, the ranking manager 806 generates a composite-importance score for each revised sentence from a set of revised sentences (e.g., revised sentences within a second version or chapter, section, or other portion of a second version).

To facilitate managing data used by the document-comparison system 704, in some embodiments, the document-comparison system 704 also includes a data manager 808. As shown in FIG. 8, the data manager 808 receives, organizes, and/or stores user data from the network 710, the third-party network server(s) 708, and/or the client devices 712a-712c (e.g., the data manager 808 performs read/write functions in connection with a database). For example, in one or more embodiments, the data manager 808 accesses data related to document-comparison application usage provided or supported by the document-management system 702. As another example, when the document-comparison system 704 (or portions of the document-comparison system 704) reside within one of the client devices 712a-712c, the data manager 808 receives or accesses data from the third-party network server(s) 708, such as different versions of a document or information from a POS Tagger or a Named Entity Recognizer.

In some embodiments, the data manager 808 identifies information within the document-comparison database 706 or the data storage 812 based on a query. For example, in some embodiments, the data manager 808 receives a query from the sentence mapper 802 to different versions of a document, including queries to identify and extract sentences from specific document versions. As another example, in some embodiments, the data manager 808 receives a query from the change-type identifier 804 to identify data for character-level features, term-level features, tag features, or term-count features from specific document versions.

Similarly, in some embodiments, the document-comparison system 704 sends queries to the third-party network server(s) 708 to obtain information concerning synonyms, such as from WordNet. In some such embodiments, the data manager 808 receives a query concerning synonyms from the change-type identifier 804, sends the query to the relevant third-party network server(s) 708, and receives information concerning synonyms for relay to the change-type identifier 804.

In addition to receiving queries, in some embodiments, the data manager 808 receives POS tags, named-entity tags, POS sequences, composite-importance scores, revision labels, or other data generated by the change-type identifier 804 or the ranking manager 806. For example, in some cases, the data manager 808 receives identifications of factual changes or paraphrasing changes generated by the change-type identifier 804 or composite-importance scores generated by the ranking manager 806 and stores the data as output data 816.

In one or more embodiments, the data manager 808 organizes data associated with a document-comparison application according to the user, document version, timestamp, topic, or some other variable. Additionally, upon generating data in response to a query from the sentence mapper 802, the change-type identifier 804, or the ranking manager 806, the data manager 808 optionally stores the query results (e.g., information for POS tags, timestamps for document versions) as a dataset for later access, such as by storing the query as query data 814 within the data storage 812. Additionally, upon generating a dataset, the data manager 808 optionally transmits or communicates with the comparison generator 810.

As indicated earlier, in some embodiments, the document-comparison system 704 further includes the comparison generator 810. The comparison generator 810 generates a comparison of a first version and a second version of a document that identifies changes by change type or rank or identifies revised sentences by rank. For example, the comparison generator 810 generates document comparisons (or lists) and options to identify or filter specific change types. The comparison generator 810 also receives indications to identify or filter changes by a certain change type or rank or revised sentences by rank, such as the user selections of filters described in connection with FIGS. 6A-6C. The comparison generator 810 likewise causes the computing device 800 to present the comparison within a graphical user interface.

As also shown in FIG. 8, the document-comparison system 704 includes the data storage 812. The data storage 812 optionally maintains query data 814, output data 816, and document versions 818. In one or more embodiments, the query data 814 comprises queries received by the data manager 808, including queries from the sentence mapper 802, change-type identifier 804, and ranking manager 806, as described above. Moreover, in some embodiments, the output data 816 includes POS tags, named-entity tags, change-type identifications, revision labels, rankings, and other outputs from the sentence mapper 802, change-type identifier 804, and ranking manager 806, as described above. Additionally, in some embodiments, the data storage 812 maintains copies of document versions, such as the first digital version 100a and the second digital version 100b, or any other document versions, described above.

Figure 9:
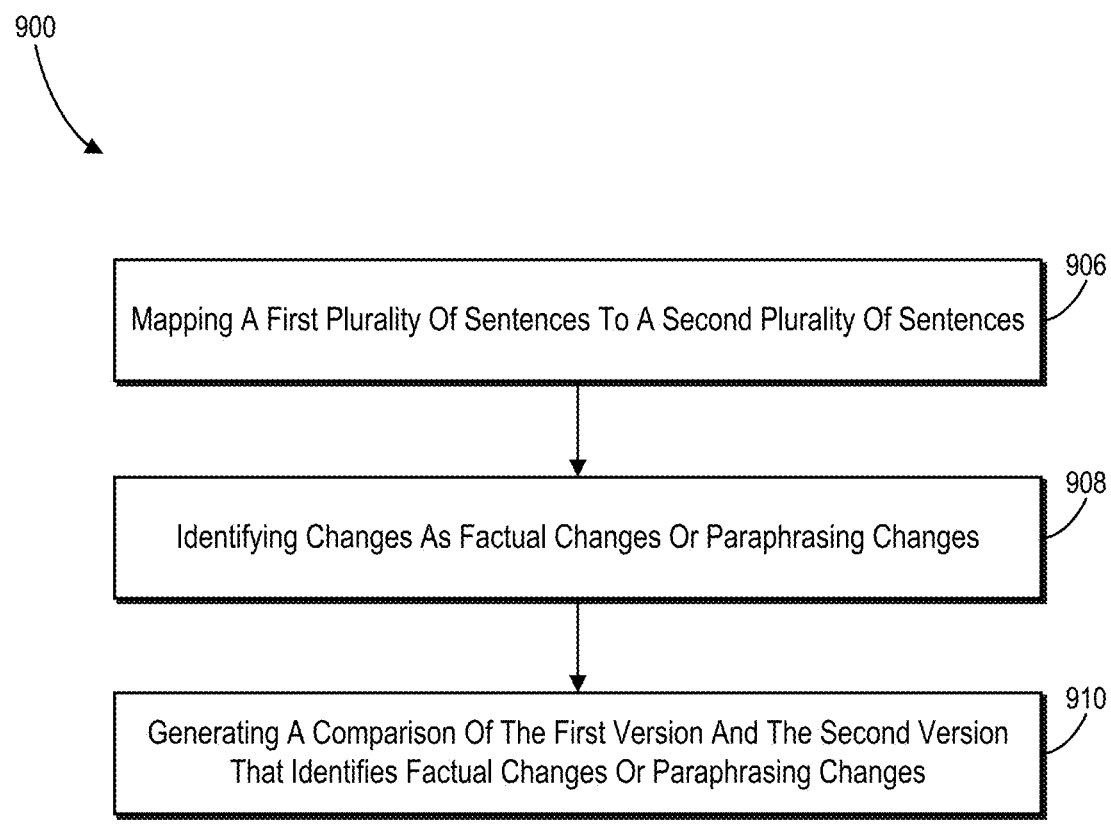
FIG. 9 illustrates a flowchart of a series of acts in a method of identifying substantive and non-substantive changes between digital document versions in accordance with one or more embodiments.

Turning now to FIG. 9, this figure illustrates a flowchart of a series of acts in a method 900 of identifying substantive and non-substantive changes between digital document versions. As shown in FIG. 9, the method 900 also includes an act 906 of mapping a first plurality of sentences to a second plurality of sentences. In particular, in one or more embodiments, act 906 includes mapping a first plurality of sentences of a first version of a document to a second plurality of sentences of a second version of the document.

For example, in some embodiments, mapping the first plurality of sentences of the first version to the second plurality of sentences of the second version comprises: mapping one or more null sentences of the first plurality of sentences to one or more additional sentences of the second plurality of sentences; or mapping one or more sentences of the first plurality of sentences to one or more additional null sentences of the second plurality of sentences; and wherein the step for classifying the one or more changes comprises classifying at least one change between the one or more null sentences and the one or more additional sentences as a factual change or a paraphrasing change or classifying at least one change between the one or more sentences and the one or more additional null sentences as a factual change or a paraphrasing change.

Additionally, in some embodiments, mapping the first plurality of sentences of the first version to the second plurality of sentences of the second version comprises: generating a sentence vector for each of the first plurality of sentences based on synonyms for each unique term within each of the first plurality of sentences and a term-similarity score for a similarity between each term of the first plurality of sentences and each additional term of the second plurality of sentences; and generating an additional sentence vector for each of the second plurality of sentences based on additional synonyms for each additional unique term within each of the second plurality of sentences and the term-similarity score for a similarity between each term of the first plurality of sentences and each additional term of the second plurality of sentences.

Moreover, in some embodiments, mapping the first plurality of sentences of the first version to the second plurality of sentences of the second version further comprises: based on the sentence vector for each of the first plurality of sentences and the additional sentence vector for each of the second plurality of sentences, generate a sentence-similarity score for a similarity between each of the first plurality of sentences and each of the second plurality of sentences; based on the sentence-similarity score for the similarity between each of the first plurality of sentences and each of the second plurality of sentences, generating a sentence matrix representing the first plurality of sentences and the second plurality of sentences; and charting a path through the sentence matrix to map the first plurality of sentences to the second plurality of sentences.

As also shown in FIG. 9, the method 900 includes an act 908 of identifying changes as factual changes or paraphrasing changes. In particular, in one or more embodiments, act 908 includes identifying changes between the first plurality of sentences and the second plurality of sentences as factual changes or paraphrasing changes. For example, in some embodiments, identifying changes between the first plurality of sentences and the second plurality of sentences as factual changes or paraphrasing changes comprises applying a deterministic classification algorithm and applying a supervised classification algorithm to classify the changes as factual changes or paraphrasing changes.

Similarly, in one or more embodiments, identifying the changes between the first plurality of sentences and the second plurality of sentences comprises: applying a deterministic classification algorithm to a plurality of mapped-sentence combinations, wherein each of the plurality of mapped-sentence combinations includes one or more sentences of the first plurality of sentences that is mapped to one or more sentences of the second plurality of sentences; and based on applying the deterministic classification algorithm, identifying at least one change of the changes as part of one of a plurality of revision categories.

In some such embodiments, identifying the at least one change of the changes as part of one of the plurality of revision categories comprises identifying the at least one of the changes as part of: an information-insert category for changes that insert information; an information-delete category for changes that delete information; an information-modify category for changes that modify information; a lexical-paraphrase category for changes that replace a term or phrase with a synonym or that modify a style of terms; and a transformational-paraphrase category for changes that reorder terms or phrases.

Relatedly, in some embodiments, applying the deterministic classification algorithm to the plurality of mapped-sentence combinations comprises: assigning a part-of-speech tag of a plurality of part-of-speech tags to each term within the first plurality of sentences and to each term within the second plurality of sentences; and assigning a named-entity tag of a plurality of named-entity tags to terms within the first plurality of sentences and to terms within the second plurality of sentences.

Moreover, in some embodiments, applying the deterministic classification algorithm to the plurality of mapped-sentence combinations comprises: identifying a first part-of-speech sequence representing a first sentence of the first plurality of sentences and a first additional part-of-speech sequence representing a first additional sentence of the second plurality of sentences, wherein the first part-of-speech sequence comprises each part-of-speech tag assigned to each term within the first sentence and the first additional part-of-speech sequence comprises each part-of-speech tag assigned to each term within the first additional sentence; identifying a second part-of-speech sequence representing a second sentence of the first plurality of sentences and a second additional part-of-speech sequence representing a second additional sentence of the second plurality of sentences, wherein the second part-of-speech sequence comprises each part-of-speech tag assigned to each term within the second sentence and the second additional part-of-speech sequence comprises each part-of-speech tag assigned to each term within the second additional sentence; determining a first longest common subsequence between the first part-of-speech sequence and the first additional part-of-speech sequence, wherein the first longest common subsequence includes part-of-speech tags commonly assigned to terms within the first sentence and the first additional sentence; and determining a second longest common subsequence between the second part-of-speech sequence and the second additional part-of-speech sequence, wherein the second longest common subsequence includes part-of-speech tags commonly assigned to terms within the second sentence and the second additional sentence.

Additionally, in some embodiments, applying the deterministic classification algorithm to the plurality of mapped-sentence combinations further comprises: determining that a first length ratio exceeds a threshold, the first length ratio comprising a first subsequence length of the longest common subsequence and a first sentence length of the longer of the first part-of-speech sequence or the first additional part-of-speech sequence; and based on determining that the first length ratio exceeds the threshold, comparing terms within the first sentence to terms within the second additional sentence.

Conversely, in some embodiments, applying the deterministic classification algorithm to the plurality of mapped-sentence combinations further comprises: determining that a second length ratio falls below a threshold, the second length ratio comprising a second subsequence length of the second longest common subsequence and a second sentence length of the longer of the second part-of-speech sequence or the second additional part-of-speech sequence; and wherein identifying the at least one change of the changes as part of one of the plurality of revision categories comprises, based on determining that the second length ratio falls below the threshold: utilizing heuristics of change within a verb sequence of the second sentence and a verb sequence of the second additional sentence; and identifying a reordering change between the second sentence and the second additional sentence as part of a transformational-paraphrase category for changes that reorder terms or phrases.

As noted above, in some embodiments of act 908, identifying changes between the first plurality of sentences and the second plurality of sentences as factual changes or paraphrasing changes comprises applying a deterministic classification algorithm and applying a supervised classification algorithm to classify the changes as factual changes or paraphrasing changes. In one or more such embodiments, identifying the changes between the first plurality of sentences and the second plurality of sentences comprises: identifying at least one mapped-sentence combination of the mapped-sentence combinations that includes at least one unidentified change of the changes that the deterministic classification algorithm did not identify as part of the plurality of revision categories, wherein the at least one mapped-sentence combination includes a third sentence of the first plurality of sentences and a third additional sentence of the second plurality of sentences; applying a supervised classification algorithm to the at least one mapped-sentence combination; and based on applying the supervised classification algorithm, identifying the at least one mapped-sentence combination as including a factual change or a paraphrasing change.

Additionally, in some embodiments, applying the supervised classification algorithm to the at least one mapped-sentence combination comprises: identifying a third part-of-speech sequence representing the third sentence and a third additional part-of-speech sequence representing the third additional sentence, wherein the third part-of-speech sequence comprises each part-of-speech tag assigned to each term within the third sentence and the third additional part-of-speech sequence comprises each part-of-speech tag assigned to each term within the third additional sentence; detecting a plurality of sentence features within the third sentence and the third additional sentence; identifying the at least one mapped-sentence combination as including a factual change or a paraphrasing change based on the plurality of sentence features, wherein the plurality of sentence features comprises: character-level features that account for numeric digits, letters, and sentence length of the third sentence and the third additional sentence; term-level features that account for edit distances between the third sentence and the third additional sentence; tag features that account for part-of-speech tags and named-entity tags assigned within the third part-of-speech sequence and the third additional part-of-speech sequence; and term-count features that account for terms within the third sentence and the third additional sentence.

As also shown in FIG. 9, the method 900 includes an act 910 of generating a comparison of the first version and the second version that identifies factual changes or paraphrasing changes.

Additionally, in some embodiments, the method 900 further comprises determining a relative importance of revised additional sentences of the second plurality of sentences, wherein the revised additional sentences include a minimum of one change of the changes. In one or more such embodiments, determining the relative importance of the revised additional sentences comprises generating a composite-importance score for each of the revised additional sentences based on a change-importance score and a sentence-importance score for each of the revised additional sentences.

Relatedly, in one or more embodiments, generating a composite-importance score for each of the revised additional sentences based on a change-importance score and a sentence-importance score for each of the revised additional sentences comprises generate the change-importance score for each of the revised additional sentences based on one or more of: a type-of-change factor that accounts for factual changes or paraphrasing changes within each of the revised additional sentences; a named-entity factor that accounts for changes to named entities within each of the revised additional sentences; and a number-of-changes factor that accounts for a number of changes of the changes within each of the revised additional sentences; and generating the sentence-importance score for each of the revised additional sentences based on one or more of: a sentence-position factor that accounts for a position of each of the revised additional sentences within the second version of the document; and a keyword-score factor that accounts for keywords within each of the revised additional sentences.

In addition to the methods described above, in some embodiments, the method 900 includes a step for classifying changes as factual changes or paraphrasing changes. For example, in some such embodiments, the method 900 includes a step for classifying changes between the first plurality of sentences and the second plurality of sentences as factual changes or paraphrasing changes. The step for classifying changes as factual changes or paraphrasing changes comprises a step for utilizing a deterministic classification algorithm and/or a step for utilizing a supervised classification algorithm.

Figure 10A:
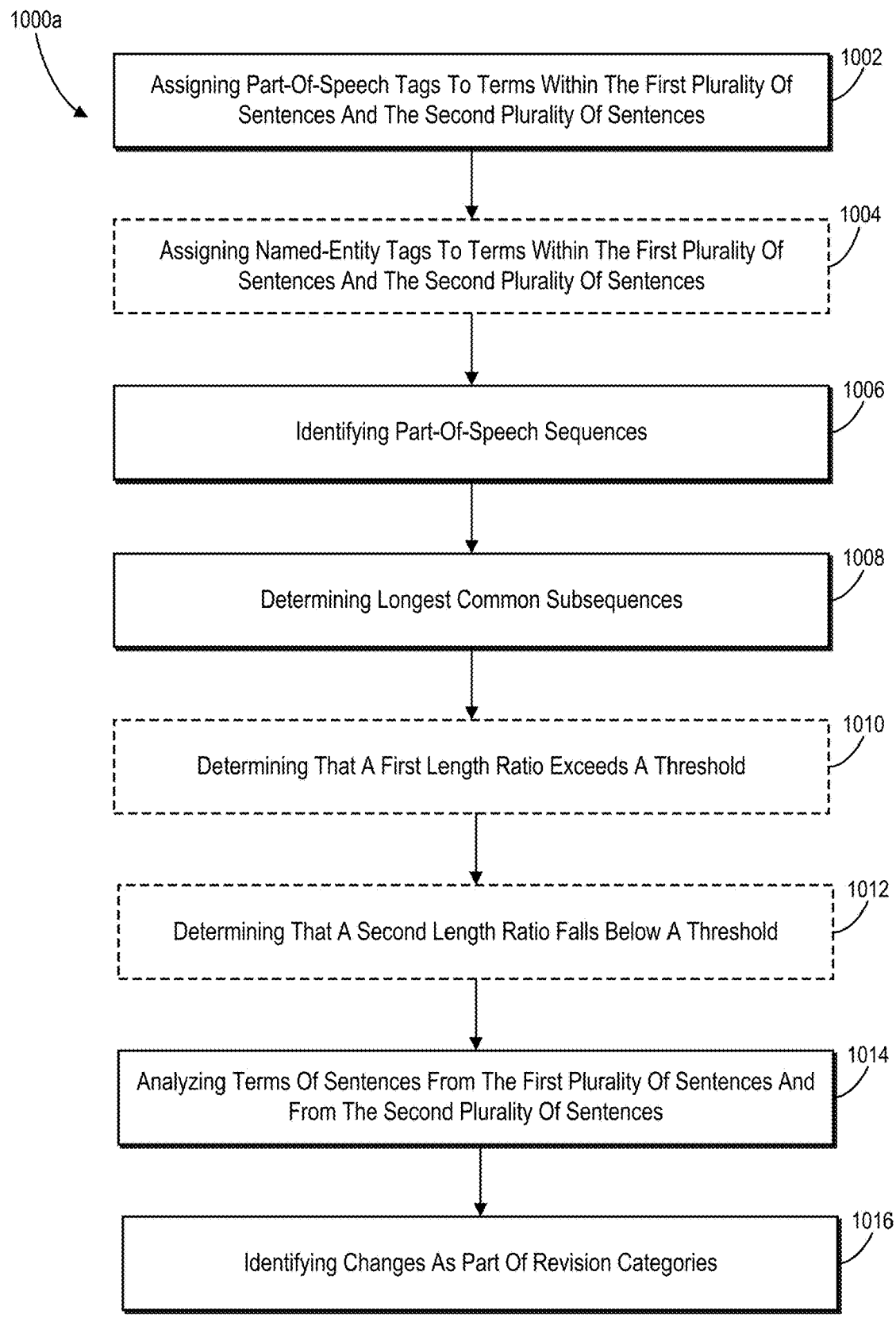
FIGS. 10A and 10B illustrate algorithms comprising a series of acts corresponding to a step for classifying changes as factual changes or paraphrasing changes in accordance with one or more embodiments.
Figure 10B:
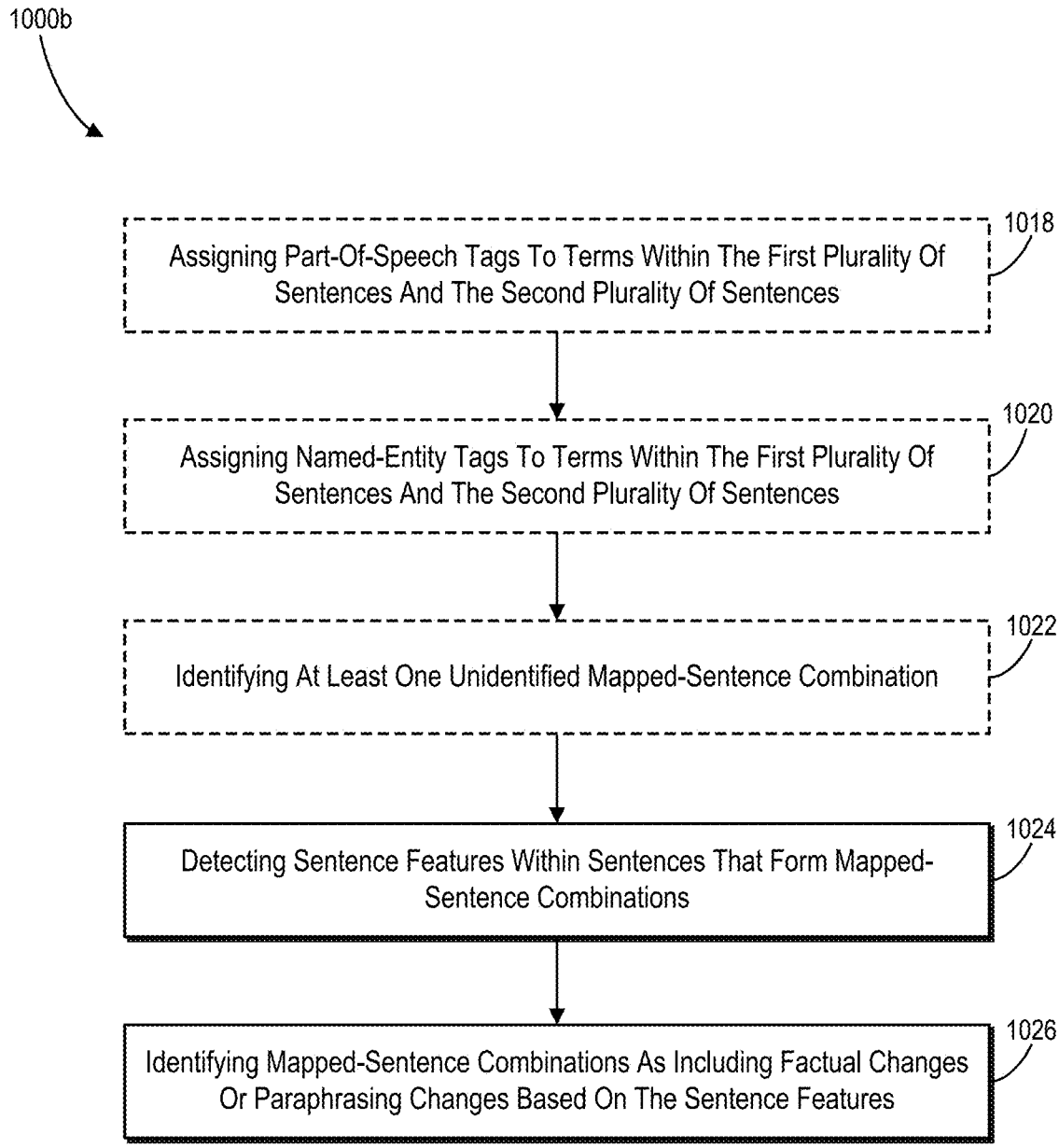

FIGS. 10A and 10B illustrate a deterministic classification algorithm and a supervised classification algorithm, respectively, each of which comprise acts that correspond to certain embodiments of the step for classifying changes as factual changes or paraphrasing changes. Specifically, FIG. 10A illustrates an algorithm 1000a that comprises acts 1002-1016 that (a) correspond to certain embodiments of performing the step for classifying changes as factual changes or paraphrasing changes and (b) correspond to the step for utilizing a deterministic classification algorithm. FIG. 10B illustrates an algorithm 1000b that comprises acts 1018-1026 that (a) correspond to certain embodiments of performing the step for classifying changes as factual changes or paraphrasing changes and (b) correspond to the step for utilizing a supervised classification algorithm.

As suggested above, in some embodiments, the acts 1002-1016 illustrated by FIG. 10A and the acts 1022-1026 illustrated by FIG. 10B together correspond to one or more embodiments of performing the step for classifying changes as factual changes or paraphrasing changes. The acts 1018 and 1020 would not be included in these latter embodiments that include some or all of the acts 1002-1026, as they would merely repeat the acts 1002 and 1004. While FIGS. 10A and 10B illustrate algorithms according to one or more embodiments, alternative embodiments may omit, add to, reorder, and/or modify any of the acts shown in FIGS. 10A and 10B. Further, the document-comparison system 704, any one of the client devices 712a-712c, or a combination of the document-comparison system 704 and one of the client devices 712a-712c, may perform one or more of the acts of the algorithms 1000a and 1000b.

As shown in FIG. 10A, the algorithm 1000a includes the act 1002 of assigning part-of-speech tags to terms within the first plurality of sentences and the second plurality of sentences. In some embodiments, the act 1002 includes assigning a part-of-speech tag of a plurality of part-of-speech tags to each term within a first plurality of sentences and to each term within a second plurality of sentences. Consistent with the disclosure above, in some embodiments, the act 1002 includes using a POS Tagger, such as a version of the Stanford Log-linear POS Tagger, to assign part-of-speech tags to each term within sentences of both a first version and a second version. Additionally, in some embodiments, the act 1002 includes assigning part-of-speech tags as demonstrated by embodiments shown and described in connection with FIG. 3A.

As also shown in FIG. 10A, the algorithm 1000a optionally includes the act 1004 of assigning named-entity tags to certain terms within the first plurality of sentences and the second plurality of sentences. In some embodiments, the act 1004 includes assigning a named-entity tag (of a plurality of named-entity tags) to terms within the first plurality of sentences and to terms within the second plurality of sentences. Consistent with the disclosure above, in some embodiments, the act 1004 includes using a Named Entity Recognizer, such as a version of the Stanford Named Entity Recognizer, to assign named-entity tags to certain terms within sentences of a first version and a second version. Alternatively, in some embodiments, the act 1004 includes using a tagger that combines the functions of a POS Tagger and a Named Entity Recognizer to assign named-entity tags. Additionally, in some embodiments, the act 1004 includes assigning named-entity tags as demonstrated by embodiments shown and described in connection with FIG. 3A.

As also shown in FIG. 10A, the algorithm 1000a includes the act 1006 of identifying part-of-speech sequences. In some embodiments, the act 1006 includes identifying part-of-speech sequences representing sentences that form multiple mapped-sentence combinations. Consistent with the disclosure above, the act 1006 includes identifying part-of-speech sequences representing sentences that form multiple mapped-sentence combinations as demonstrated by embodiments shown and described in connection with FIG. 3A.

For example, in some instances, the act 1006 includes identifying a first part-of-speech sequence representing a first sentence of the first plurality of sentences and a first additional part-of-speech sequence representing a first additional sentence of the second plurality of sentences, wherein the first part-of-speech sequence comprises each part-of-speech tag assigned to each term within the first sentence and the first additional part-of-speech sequence comprises each part-of-speech tag assigned to each term within the first additional sentence and identifying a second part-of-speech sequence representing a second sentence of the first plurality of sentences and a second additional part-of-speech sequence representing a second additional sentence of the second plurality of sentences, wherein the second part-of-speech sequence comprises each part-of-speech tag assigned to each term within the second sentence and the second additional part-of-speech sequence comprises each part-of-speech tag assigned to each term within the second additional sentence.

As also shown in FIG. 10A, the algorithm 1000a includes the act 1008 of determining longest common subsequences. In some embodiments, the act 1008 includes determining longest common subsequences between part-of-speech sequences that correspond to mapped-sentence combinations. Consistent with the disclosure above, the act 1006 includes determining longest common subsequences between part-of-speech sequences that correspond to mapped-sentence combinations as demonstrated by embodiments shown and described in connection with FIG. 3A.

For example, in some embodiments, the act 1008 includes determining a first longest common subsequence between the first part-of-speech sequence and the first additional part-of-speech sequence, wherein the first longest common subsequence includes part-of-speech tags commonly assigned to terms within the first sentence and the first additional sentence; and determining a second longest common subsequence between the second part-of-speech sequence and the second additional part-of-speech sequence, wherein the second longest common subsequence includes part-of-speech tags commonly assigned to terms within the second sentence and the second additional sentence.

As also shown in FIG. 10A, the algorithm 1000a optionally includes the act 1010 of determining that a first length ratio exceeds a threshold. In some embodiments, the act 1010 includes determining whether a length ratio exceeds an empirically determined threshold based on training sets of corresponding document versions. Consistent with the disclosure above, the act 1010 includes determining whether a length ratio exceeds a threshold as demonstrated by embodiments shown and described in connection with FIG. 3A.

For example, in some embodiments, the act 1010 includes determining that a first length ratio exceeds a threshold, the first length ratio comprising a first subsequence length of the longest common subsequence and a first sentence length of the longer of the first part-of-speech sequence or the first additional part-of-speech sequence.

As also shown in FIG. 10A, the algorithm 1000a optionally includes the act 1012 of determining that a second length ratio falls below a threshold. In some embodiments, the act 1012 includes determining whether a length ratio falls below an empirically determined threshold based on training sets of corresponding document versions. Consistent with the disclosure above, the act 1012 includes determining whether a length ratio exceeds a threshold as demonstrated by embodiments shown and described in connection with FIG. 3A.

For example, in some embodiments, the act 1012 includes determining that a second length ratio falls below a threshold, the second length ratio comprising a second subsequence length of the second longest common subsequence and a second sentence length of the longer of the second part-of-speech sequence or the second additional part-of-speech sequence.

In some embodiments of the algorithm 1000a, both the act 1010 and the act 1012 include determining a mapped-sentence similarity between sentences of a first version mapped to sentences of a second version. When determining a mapped-sentence similarity, the acts 1010 and 1012 may include determining a length ratio of (a) a length of a longest common subsequence and (b) a length of the longer of two or more POS sequences corresponding to mapped sentences. Alternatively, when determining a mapped-sentence similarity, the acts 1010 and 1012 may include determining a length ratio of (a) a length in number of terms of a longest common term sequence and (b) a length in number of terms of the longer of two or more mapped sentences.

As also shown in FIG. 10A, the algorithm 1000a includes the act 1014 of analyzing terms of sentences from the first plurality of sentences and from the second plurality of sentences. In some embodiments, the act 1014 includes following the analysis rules described above. Consistent with the disclosure above, in some embodiments, the act 1014 includes analyzing terms of sentences from sentences as demonstrated by embodiments shown and described in connection with FIG. 3B.

As also shown in FIG. 10A, the algorithm 1000a includes the act 1016 of identifying changes as part of revision categories. Consistent with the disclosure above and the analysis rules, the act 1016 includes identifying changes as part of an information-insert category for changes that insert information; an information-delete category for changes that delete information; an information-modify category for changes that modify information; a lexical-paraphrase category for changes that replace a term or phrase with a synonym or that modify a style of terms; and a transformational-paraphrase category for changes that reorder terms or phrases. In some embodiments, the act 1016 includes identifying changes as part of revision categories as demonstrated by embodiments shown and described in connection with FIG. 3B.

Turning now to FIG. 10B, as mentioned above, this figure illustrates the algorithm 1000b that comprises acts 1018-1026 that (a) correspond to certain embodiments of performing the step for classifying changes as factual changes or paraphrasing changes and (b) correspond to the step for utilizing a supervised classification algorithm.

As shown in FIG. 10B, the algorithm 1000b optionally includes the act 1018 of assigning part-of-speech tags to terms within the first plurality of sentences and the second plurality of sentences. The algorithm 1000b also optionally includes the act 1020 of assigning named-entity tags to certain terms within the first plurality of sentences and the second plurality of sentences. The acts 1018 and 1020 comprise the same assigning of part-of-speech tags and the same assigning of named-entity tags as described for the acts 1002 and 1004. Accordingly, the optional acts 1018 and 1020 correspond to the step for utilizing a supervised classification algorithm or the step for classifying changes as factual changes or paraphrasing changes only in embodiments that do not also perform the acts 1002 and 1004.

As also shown in FIG. 10B, the algorithm 1000b optionally includes the act 1022 of identifying at least one unidentified mapped-sentence combination. In some embodiments, the act 1022 includes identifying any mapped-sentence combination that include changes that the deterministic classification algorithm did not (or could not identify as part of a revision category.

For example, in some embodiments, the act 1022 includes identifying at least one mapped-sentence combination of the mapped-sentence combinations that includes at least one unidentified change of changes that the deterministic classification algorithm did not identify as part of the plurality of revision categories, wherein the at least one mapped-sentence combination includes a sentence of the first plurality of sentences and an additional sentence of the second plurality of sentences.

As also shown in FIG. 10B, the algorithm 1000b includes the act 1024 of detecting sentence features within sentences that form mapped-sentence combinations. In some embodiments, the act 1024 includes analyzing sentences that form mapped-sentence combinations to detect one or more of character-level features, term-level features, tag features, and term-count features, as described above. Consistent with the disclosure above, in some cases, the act 1024 includes detecting sentence features within sentences that form mapped-sentence combinations as demonstrated by embodiments shown and described in connection with FIG. 4.

As also shown in FIG. 10B, the algorithm 1000b includes the act 1026 of identifying mapped-sentence combinations as including factual changes or paraphrasing changes based on the sentence features. For instance, in some embodiments, the act 1024 includes applying an SVM classifier to identify mapped-sentence combinations to include factual changes or paraphrasing changes based on one or more of character-level features, term-level features, tag features, and term-count features. Consistent with the disclosure above, in some cases, the act 1024 includes identifying mapped-sentence combinations to include factual changes or paraphrasing changes as demonstrated by embodiments shown and described in connection with FIG. 4.

Figure 11:
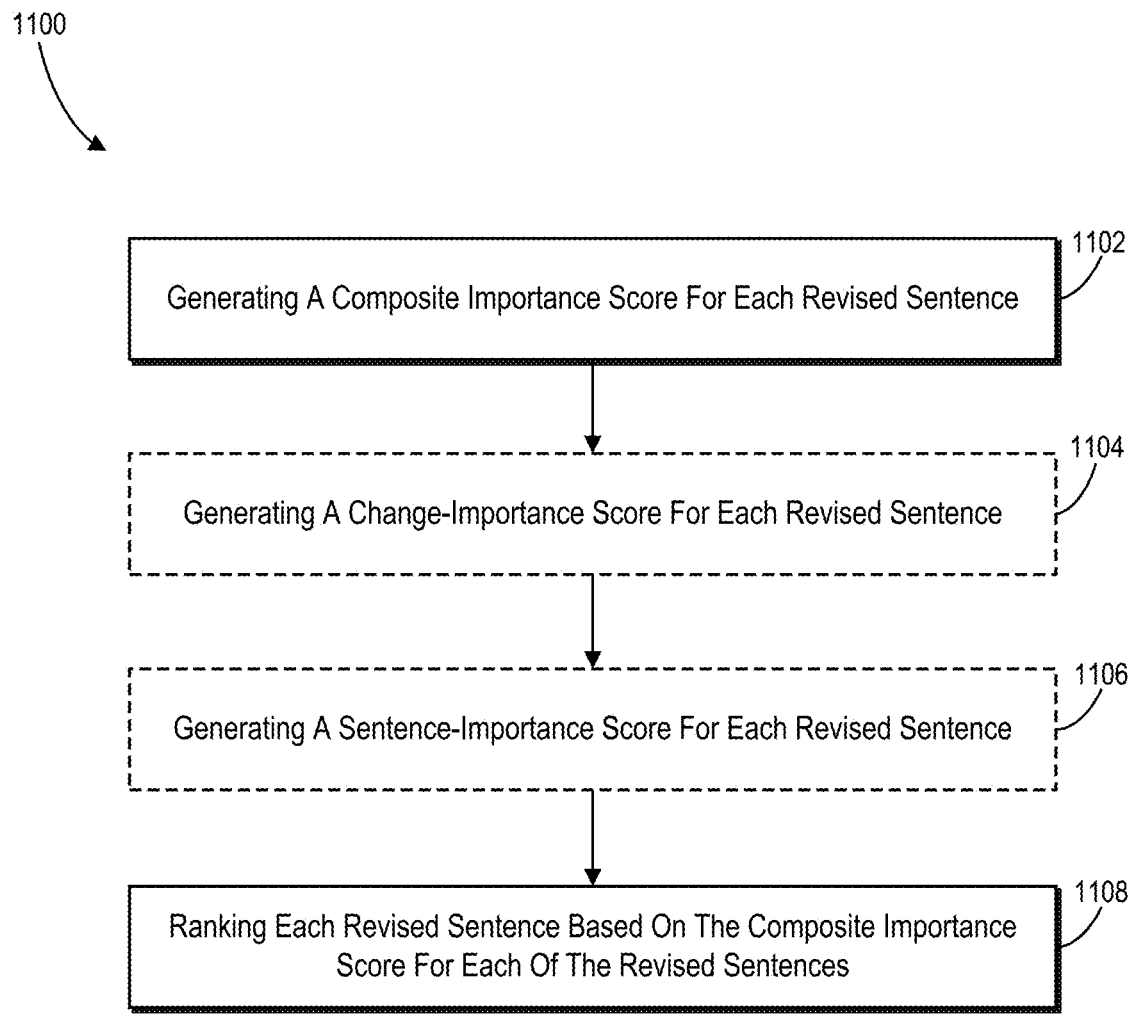
FIG. 11 illustrates an algorithm comprising a series of acts corresponding to a step for ranking revised sentences in accordance with one or more embodiments.

In addition to the methods and algorithms described above, in some embodiments, the method 900 includes a step for ranking revised sentences. For example, in some such embodiments, the method 900 includes a step for ranking sentences of a second plurality of sentences having changes relative to a first plurality of sentences. FIG. 11 illustrates an algorithm that comprises acts that correspond to the step for ranking revised sentences.

Specifically, FIG. 11 illustrates an algorithm 1100 that corresponds to one or more embodiments of performing a step for ranking revised sentences. While FIG. 11 illustrates algorithms according to one or more embodiments, alternative embodiments may omit, add to, reorder, and/or modify any of the acts shown in FIG. 11. Further, the document-comparison system 704, any one of the client devices 712a-712c, or a combination of the document-comparison system 704 and one of the client devices 712a-712c, may perform one or more of the acts of the algorithm 1100.

As shown in FIG. 11, the algorithm 1100 includes an act 1102 of generating a composite-importance score for each revised sentence. Consistent with the disclosure above, in some cases, the act 1102 includes generating a composite-importance score as demonstrated by embodiments shown and described in connection with FIG. 5. Additionally, in some embodiments, the act 1102 includes generating a composite-importance score for each revised sentence based on a weighted sum of a change-importance score and a sentence-importance score, as described above. A composite-importance score can, however, be based exclusively on either a change-importance score or a sentence-importance score for a revised sentence. The following paragraphs briefly describe generating a change-importance score and a sentence-importance score consistent with the disclosure above.

As also shown in FIG. 11, the algorithm 1100 optionally includes an act 1104 of generating a change-importance score for each revised sentence. Consistent with the disclosure above, in some embodiments, the act 1104 includes generating a change-importance score for each of multiple revised sentences based on one or more of a type-of-change factor that accounts for factual changes or paraphrasing changes within each of the revised sentences; a named-entity factor that accounts for changes to named entities within each of the revised sentences; and a number-of-changes factor that accounts for a number of changes of the one or more changes within each of the revised sentences. Additionally, in some embodiments, the act 1104 includes generating a change-importance score as demonstrated by embodiments shown and described in connection with FIG. 5.

As also shown in FIG. 11, the algorithm 1100 optionally includes an act 1106 of generating a sentence-importance score for each revised sentence. Consistent with the disclosure above, in some embodiments, the act 1106 includes generating a sentence-importance score for each of multiple revised sentences based on one or more of a sentence-position factor that accounts for a position of each of the revised sentences within a second version of a document and a keyword-score factor that accounts for keywords within each of the revised sentences. Additionally, in some embodiments, the act 1106 includes generating a sentence-importance score as demonstrated by embodiments shown and described in connection with FIG. 5.

As also shown in FIG. 11, the algorithm 1100 includes an act 1108 of ranking each revised sentence based on the composite-importance score for each of the revised sentences. In particular, the act 1108 can include ranking each revised sentence within a version (or within a chapter, section, or other portion of a version) based on the composite-importance score for each of the revised sentences within a version (or within a chapter, section, or other portion of a version). Additionally, in some embodiments, the act 1108 includes ranking each revised sentence based on the composite-importance score for each of the revised sentences as demonstrated by embodiments shown and described in connection with FIG. 5.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 12:
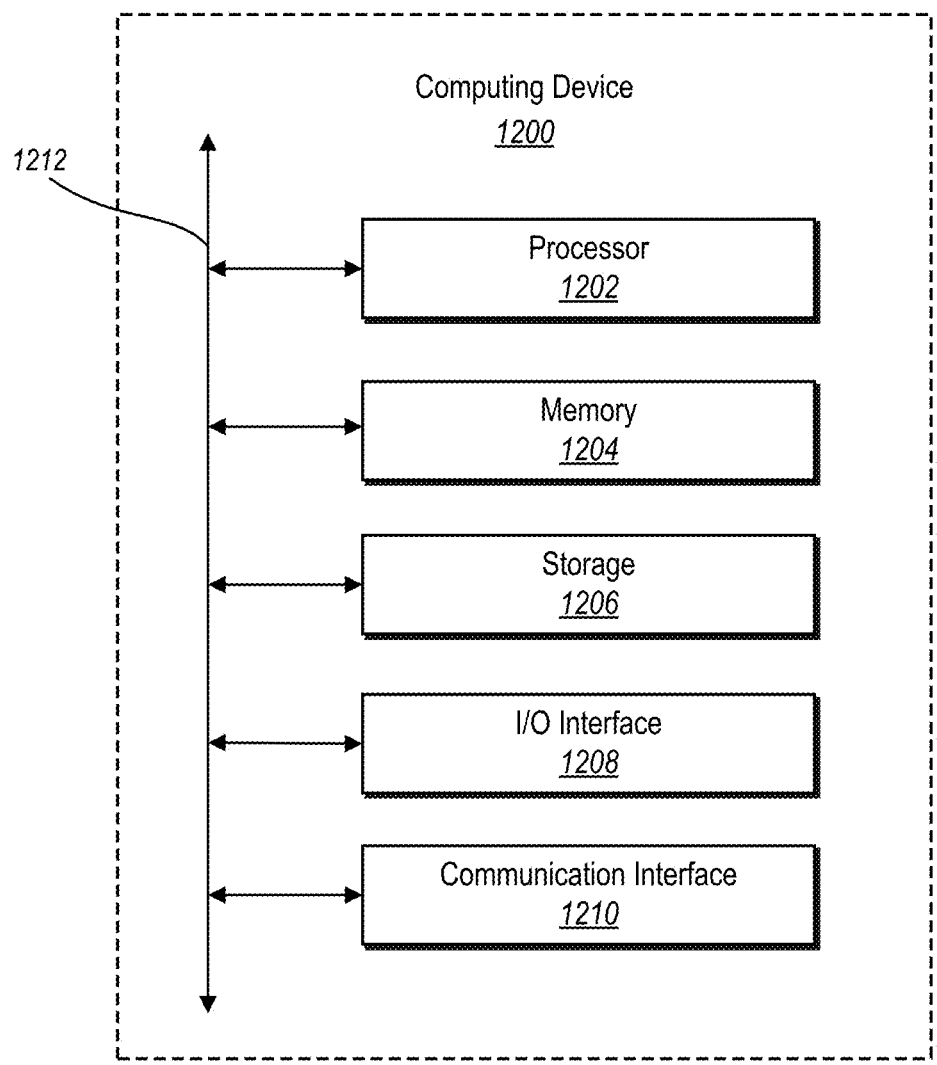
FIG. 12 illustrates a block diagram of a computing device in accordance with one or more embodiments.

FIG. 12 illustrates a block diagram of exemplary computing device 1200 that may be configured to perform one or more of the processes described above. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example and not by way of limitation, to execute instructions for digitizing real-world objects, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions related to object digitizing processes (e.g., digital scans, digital models). For example, the memory 1204 can store the AR analysis database 1106.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for generating comparisons of digital document versions, a computer-implemented method of identifying substantive and non-substantive changes between digital document versions comprising:
    mapping a first plurality of sentences of a first version of a document to a second plurality of sentences of a second version of the document;
    identifying changes between the first plurality of sentences and the second plurality of sentences as factual changes or paraphrasing changes by:
        applying a deterministic classification algorithm to a plurality of mapped-sentence combinations; and
        applying a supervised classification algorithm to unidentified mapped-sentence combinations of the plurality of mapped-sentence combinations, the unidentified mapped-sentence combinations comprising at least one change from the changes that the deterministic classification algorithm did not identify;
    generating, for display within a graphical user interface, a document comparison of the first version and the second version that identifies the changes as factual changes or paraphrasing changes, the document comparison comprising a factual-change filter for identifying factual changes and a paraphrasing-change filter for identifying paraphrasing changes; and
    based on receiving an indication of a selection of the factual-change filter or the paraphrasing-change filter, modifying the document comparison to identify factual changes using a first type of markings for changed text or paraphrasing changes using a second type of markings for changed text.

2. The method of claim 1, further comprising determining a relative importance of revised sentences of the second plurality of sentences, wherein the revised sentences include a minimum of one change of the changes.

3. The method of claim 2, wherein determining the relative importance of the revised sentences comprises generating a composite-importance score for each of the revised sentences based on a change-importance score and a sentence-importance score for each of the revised sentences.

4. The method of claim 1, wherein mapping the first plurality of sentences of the first version to the second plurality of sentences of the second version comprises:
    mapping one or more null sentences of the first plurality of sentences to one or more sentences of the second plurality of sentences; or
    mapping one or more sentences of the first plurality of sentences to one or more null sentences of the second plurality of sentences.

5. The method of claim 1, further comprising:
    identifying a plurality of similar changes to a repeated phrase from among the changes between the first plurality of sentences and the second plurality of sentences; and
    wherein generating the document comparison of the first version and the second version comprises grouping together the plurality of similar changes to the repeated phrase for display within the document comparison.

6. A non-transitory computer readable medium storing instructions thereon that, when executed by at least one processor, cause a computing device to:
map a first plurality of sentences of a first version of a document to a second plurality of sentences of a second version of the document;
identify changes between the first plurality of sentences and the second plurality of sentences as factual changes or paraphrasing changes by:
applying a deterministic classification algorithm to a plurality of mapped-sentence combinations; and
applying a supervised classification algorithm to unidentified mapped-sentence combinations of the plurality of mapped-sentence combinations, the unidentified mapped-sentence combinations comprising at least one change from the changes that the deterministic classification algorithm did not identify;
generate, for display within a graphical user interface, a document comparison of the first version and the second version that identifies the changes as factual changes or paraphrasing changes, the document comparison comprising a factual-change filter for identifying factual changes and a paraphrasing-change filter for identifying paraphrasing changes; and
based on receiving an indication of a selection of the factual-change filter or the paraphrasing-change filter, modify the document comparison to identify factual changes using a first type of markings for changed text or paraphrasing changes using a second type of markings for changed text.

7. The non-transitory computer readable medium of claim 6, further comprising instructions that, when executed by the at least one processor, cause the computing device to apply the deterministic classification algorithm to the plurality of mapped-sentence combinations by:
identifying the plurality of mapped-sentence combinations, wherein each of the plurality of mapped-sentence combinations includes one or more sentences of the first plurality of sentences that is mapped to one or more sentences of the second plurality of sentences; and
applying the deterministic classification algorithm to the plurality of mapped-sentence combinations to identify at least one change from the changes as part of a revision category of a plurality of revision categories.

8. The non-transitory computer readable medium of claim 7, further comprising instructions that, when executed by the at least one processor, cause the computing device to identify the at least one change from the changes as part of the revision category of the plurality of revision categories by identifying the at least one change as part of:
an information-insert category for changes that insert information;
an information-delete category for changes that delete information;
an information-modify category for changes that modify information;
a lexical-paraphrase category for changes that replace a term or phrase with a synonym or that modify a style of terms; and
a transformational-paraphrase category for changes that reorder terms or phrases.

9. The non-transitory computer readable medium of claim 6, further comprising instructions that, when executed by the at least one processor, cause the computing device to apply the deterministic classification algorithm to the plurality of mapped-sentence combinations by:
assigning a part-of-speech tag of a plurality of part-of-speech tags to each term within the first plurality of sentences and to each term within the second plurality of sentences; and
assigning a named-entity tag of a plurality of named-entity tags to terms within the first plurality of sentences and to terms within the second plurality of sentences.

10. The non-transitory computer readable medium of claim 6, further comprising instructions that, when executed by the at least one processor, cause the computing device to apply the deterministic classification algorithm to the plurality of mapped-sentence combinations by:
identifying a first part-of-speech sequence representing a first sentence of the first plurality of sentences and a first additional part-of-speech sequence representing a first additional sentence of the second plurality of sentences, wherein the first part-of-speech sequence comprises each part-of-speech tag assigned to each term within the first sentence and the first additional part-of-speech sequence comprises each part-of-speech tag assigned to each term within the first additional sentence;
identifying a second part-of-speech sequence representing a second sentence of the first plurality of sentences and a second additional part-of-speech sequence representing a second additional sentence of the second plurality of sentences, wherein the second part-of-speech sequence comprises each part-of-speech tag assigned to each term within the second sentence and the second additional part-of-speech sequence comprises each part-of-speech tag assigned to each term within the second additional sentence;
determining a first longest common subsequence between the first part-of-speech sequence and the first additional part-of-speech sequence, wherein the first longest common subsequence includes part-of-speech tags commonly assigned to terms within the first sentence and the first additional sentence; and
determining a second longest common subsequence between the second part-of-speech sequence and the second additional part-of-speech sequence, wherein the second longest common subsequence includes part-of-speech tags commonly assigned to terms within the second sentence and the second additional sentence.

11. The non-transitory computer readable medium of claim 10, further comprising instructions that, when executed by the at least one processor, cause the computing device to apply the deterministic classification algorithm to the plurality of mapped-sentence combinations by:
determining that a first length ratio exceeds a threshold, the first length ratio comprising a first subsequence length of a longest common subsequence and a first sentence length of a longer of the first part-of-speech sequence or the first additional part-of-speech sequence; and
based on determining that the first length ratio exceeds the threshold, comparing terms within the first sentence to terms within the second additional sentence.

12. The non-transitory computer readable medium of claim 10, further comprising instructions that, when executed by the at least one processor, cause the computing device to:

apply the deterministic classification algorithm to the plurality of mapped-sentence combinations by determining that a second length ratio falls below a threshold, the second length ratio comprising a second sub-sequence length of the second longest common subsequence and a second sentence length of a longer of the second part-of-speech sequence or the second additional part-of-speech sequence; and identify at least one change from the changes as part of a revision category of a plurality of revision categories by, based on determining that the second length ratio falls below the threshold:

comparing a verb sequence of the second sentence with a verb sequence of the second additional sentence; and identifying a reordering change between the second sentence and the second additional sentence as part of a transformational-paraphrase category for changes that reorder terms or phrases.

13. The non-transitory computer readable medium of claim 6, further comprising instructions that, when executed by the at least one processor, cause the computing device to:

map the first plurality of sentences to the second plurality of sentences by:

mapping one or more null sentences of the first plurality of sentences to one or more sentences of the second plurality of sentences; or mapping one or more sentences of the first plurality of sentences to one or more null sentences of the second plurality of sentences; and identify the changes between the first plurality of sentences and the second plurality of sentences as factual changes or paraphrasing changes in part by:

identifying at least one change between the one or more null sentences and the one or more sentences as a factual change or a paraphrasing change; or identifying at least one change between the one or more sentences and the one or more null sentences as a factual change or a paraphrasing change.

14. The non-transitory computer readable medium of claim 6, further comprising instructions that, when executed by the at least one processor, cause the computing device to apply the supervised classification algorithm to at least one unidentified mapped-sentence combination comprising a sentence and an additional sentence by:

identifying a part-of-speech sequence representing the sentence and an additional part-of-speech sequence representing the additional sentence, wherein the part-of-speech sequence comprises each part-of-speech tag assigned to each term within the sentence and the additional part-of-speech sequence comprises each part-of-speech tag assigned to each term within the additional sentence;

detecting a plurality of sentence features within the sentence and the additional sentence;

identifying the at least one mapped-sentence combination as including a factual change or a paraphrasing change based on the plurality of sentence features, wherein the plurality of sentence features comprises:

character-level features that account for numeric digits, letters, and sentence length of the sentence and the additional sentence;

term-level features that account for edit distances between the sentence and the additional sentence;

tag features that account for part-of-speech tags and named-entity tags assigned within the part-of-speech sequence and the additional part-of-speech sequence; and term-count features that account for terms within the sentence and the additional sentence.

15. A system for generating comparisons of digital document versions that identifies substantive and non-substantive changes between digital document versions comprising:

memory comprising models for classification algorithms; and a computing device comprising instructions thereon that, when executed by the computing device, cause the system to:

map a first plurality of sentences of a first version of a document to a second plurality of sentences of a second version of the document;

identify changes between the first plurality of sentences and the second plurality of sentences as factual changes or paraphrasing changes by:

applying a deterministic classification algorithm to a plurality of mapped-sentence combinations; and applying a supervised classification algorithm to unidentified mapped-sentence combinations of the plurality of mapped-sentence combinations, the unidentified mapped-sentence combinations comprising at least one change from the changes that the deterministic classification algorithm did not identify; and generate a comparison of the first version and the second version that identifies the changes as factual changes or paraphrasing changes.

16. The system of claim 15, further comprising instructions that, when executed by the computing device, cause the system to determine a relative importance of revised sentences of the second plurality of sentences, wherein the revised sentences include a minimum of one change of the changes.

17. The system of claim 16, further comprising instructions that, when executed by the computing device, cause the system to determine the relative importance of the revised sentences by generating a composite-importance score for each of the revised sentences based on a change-importance score and a sentence-importance score for each of the revised sentences.

18. The system of claim 17, further comprising instructions that, when executed by the computing device, cause the system to determine the relative importance of the revised sentences by:

generating the change-importance score for each of the revised sentences based on one or more of:

a type-of-change factor that accounts for factual changes or paraphrasing changes within each of the revised sentences;

a named-entity factor that accounts for changes to named entities within each of the revised sentences; and a number-of-changes factor that accounts for a number of changes of the changes within each of the revised sentences;

and generating the sentence-importance score for each of the revised sentences based on one or more of:

a sentence-position factor that accounts for a position of each of the revised sentences within the second version of the document; and a keyword-score factor that accounts for keywords within each of the revised sentences.

19. The system of claim 15, further comprising instructions that, when executed by the computing device, cause the system to map the first plurality of sentences of the first version to the second plurality of sentences of the second version by:

generating a sentence vector for each of the first plurality of sentences based on synonyms for each unique term within each of the first plurality of sentences and a term-similarity score for a similarity between each term of the first plurality of sentences and each additional term of the second plurality of sentences; and generating an additional sentence vector for each of the second plurality of sentences based on additional synonyms for each additional unique term within each of the second plurality of sentences and the term-similarity score for the similarity between each term of the first plurality of sentences and each additional term of the second plurality of sentences.

20. The system of claim 19, further comprising instructions that, when executed by the computing device, cause the system to map the first plurality of sentences of the first version to the second plurality of sentences of the second version by:

based on the sentence vector for each of the first plurality of sentences and the additional sentence vector for each of the second plurality of sentences, generating a sentence-similarity score for a similarity between each of the first plurality of sentences and each of the second plurality of sentences;

based on the sentence-similarity score for the similarity between each of the first plurality of sentences and each of the second plurality of sentences, generating a sentence matrix representing the first plurality of sentences and the second plurality of sentences; and charting a path through the sentence matrix to map the first plurality of sentences to the second plurality of sentences.

* * * * *